(12) United States Patent
Whyatt et al.

(10) Patent No.: US 6,994,829 B2
(45) Date of Patent: Feb. 7, 2006

(54) FLUID PROCESSING DEVICE AND METHOD

(75) Inventors: Greg A. Whyatt, West Richland, WA (US); James M. Davis, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 511 days.

(21) Appl. No.: 10/164,969

(22) Filed: Jun. 6, 2002

(65) Prior Publication Data

US 2004/0013585 A1    Jan. 22, 2004

Related U.S. Application Data

(60) Provisional application No. 60/363,269, filed on Mar. 11, 2002, provisional application No. 60/296,295, filed on Jun. 6, 2001.

(51) Int. Cl.
*B01D 53/54* (2006.01)
*F26B 7/00* (2006.01)

(52) U.S. Cl. ............... 422/177; 422/159; 165/167; 165/165; 165/80.4; 34/433; 34/417; 34/487

(58) Field of Classification Search ............... 422/177, 422/159, 198; 165/167, 165, 80.4; 34/433, 34/417, 487
See application file for complete search history.

(56) References Cited

U.S. PATENT DOCUMENTS

| | | |
|---|---|---|
| 4,516,632 A | 5/1985 | Swift et al. |
| 4,729,428 A | 3/1988 | Yasutake et al. |
| 5,016,707 A | 5/1991 | Nguyen |
| 5,212,004 A | 5/1993 | Böttcher et al. |
| 5,270,127 A | 12/1993 | Koga et al. |
| 5,275,235 A | 1/1994 | Cesaroni |
| 5,409,058 A | 4/1995 | Yuasa et al. |
| 5,455,401 A | 10/1995 | Dumais et al. |

(Continued)

FOREIGN PATENT DOCUMENTS

WO    WO 99 66279    12/1999

OTHER PUBLICATIONS

Integration of microfluidics/electromechanical system for trace metal analysis by stripping voltammetry, Yuehe Lin, Rhi Zhao, K D Timchalk, W D Bennett, D W Matson, Reprinted from Microfluidic Devices and Systems II, Sep. 20-21, 1999, Santa Clara, CA, Proceedings of SPIE Reprint.

(Continued)

*Primary Examiner*—N. Bhat
(74) *Attorney, Agent, or Firm*—Klarquist Sparkman LLP

(57)    ABSTRACT

A fluid processing unit having first and second interleaved flow paths in a cross flow configuration is disclosed. The first flow paths are substantially longer than the second flow paths such that the pressure drop in the second flow paths can be maintained at a relatively low level and temperature variations across the second flow paths are reduced. One or more of the flow paths can be microchannels. When used as a vaporizer and/or superheater, the longer first flow paths include an upstream liquid flow portion and a downstream vapor flow portion of enlarged cross sectional area. A substantial pressure drop is maintained through the upstream liquid flow portion for which one or more tortuous flow channels can be utilized. The unit is a thin panel, having a width substantially less its length or height, and is manufactured together with other thin units in a bonded stack of thin metal sheets. The individual units are then separated from the stack after bonding.

61 Claims, 13 Drawing Sheets

U.S. PATENT DOCUMENTS

| | | |
|---|---|---|
| 5,534,328 A | 7/1996 | Ashmead et al. |
| 5,611,214 A | 3/1997 | Wegeng et al. |
| 5,620,616 A | 4/1997 | Anderson et al. |
| 5,657,818 A | 8/1997 | Böttcher et al. |
| 5,658,537 A | 8/1997 | Dugan |
| 5,660,227 A | 8/1997 | Crowe |
| 5,690,763 A | 11/1997 | Ashmead et al. |
| 5,749,413 A | 5/1998 | Crowe |
| 5,811,062 A | 9/1998 | Wegeng et al. |
| 5,836,383 A | 11/1998 | Zwittig |
| 5,843,385 A | 12/1998 | Dugan |
| 5,911,273 A | 6/1999 | Brenner et al. |
| 6,082,449 A | 7/2000 | Yamaguchi et al. |
| 6,129,973 A | 10/2000 | Martin et al. |
| 6,152,215 A | 11/2000 | Niggemann |
| 6,192,596 B1 | 2/2001 | Bennett et al. |
| 6,200,536 B1 | 3/2001 | Tonkovich et al. |

OTHER PUBLICATIONS

Laser micromachined and laminated microchannel components for chemical sensors and heat transfer applications, P M Martin, W D Bennett, D J Hammerstrom, J W Johnston, D W Matson, Reprinted from Micromachined Devices and Components III, Sep. 29, 1997, Austin, TX, Proceedings Reprint.

"Design and Fabrication of a Cross Flow Micro Heat Exchanger", Harris C et al; Journal of Microelectromechanical systems, IEEE Inc., New York, U.S., vol. 9, No. 4, Dec. 2000, pp. 502-508.

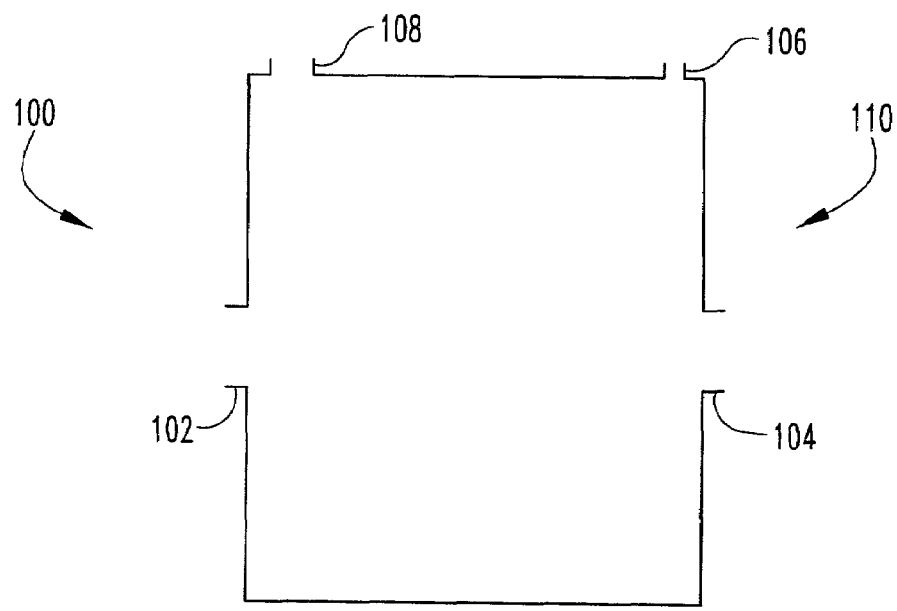
Fig. 1A
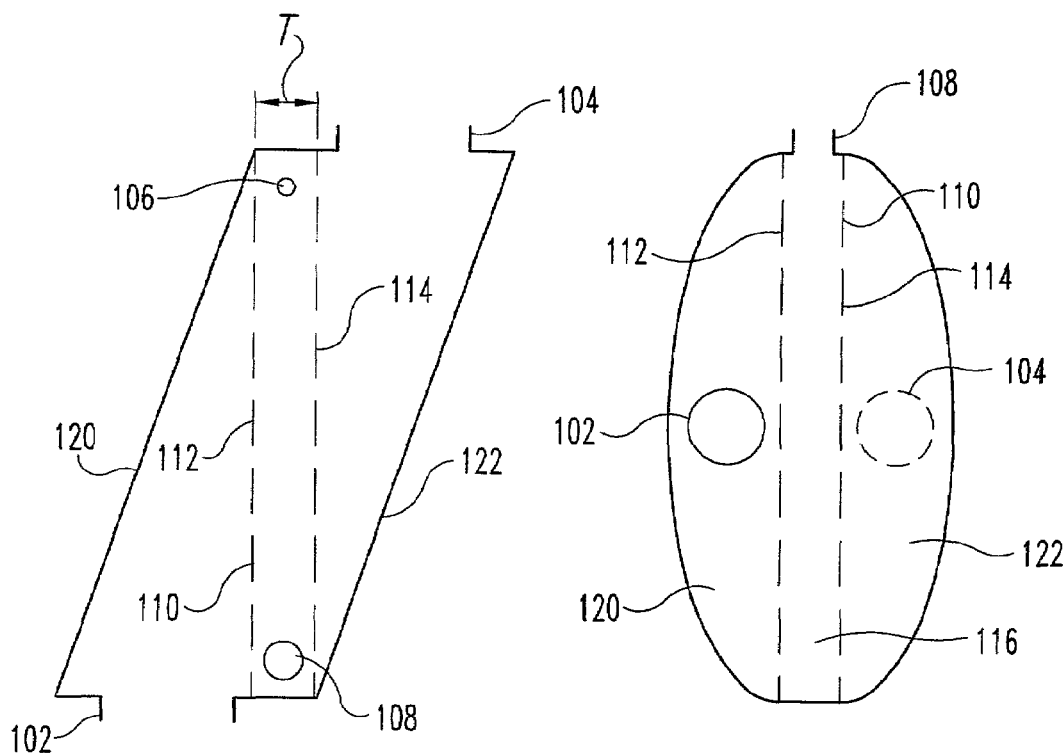
Fig. 1B   Fig. 1C

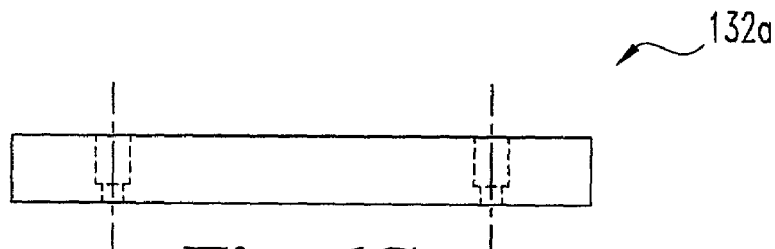
Fig. 6C
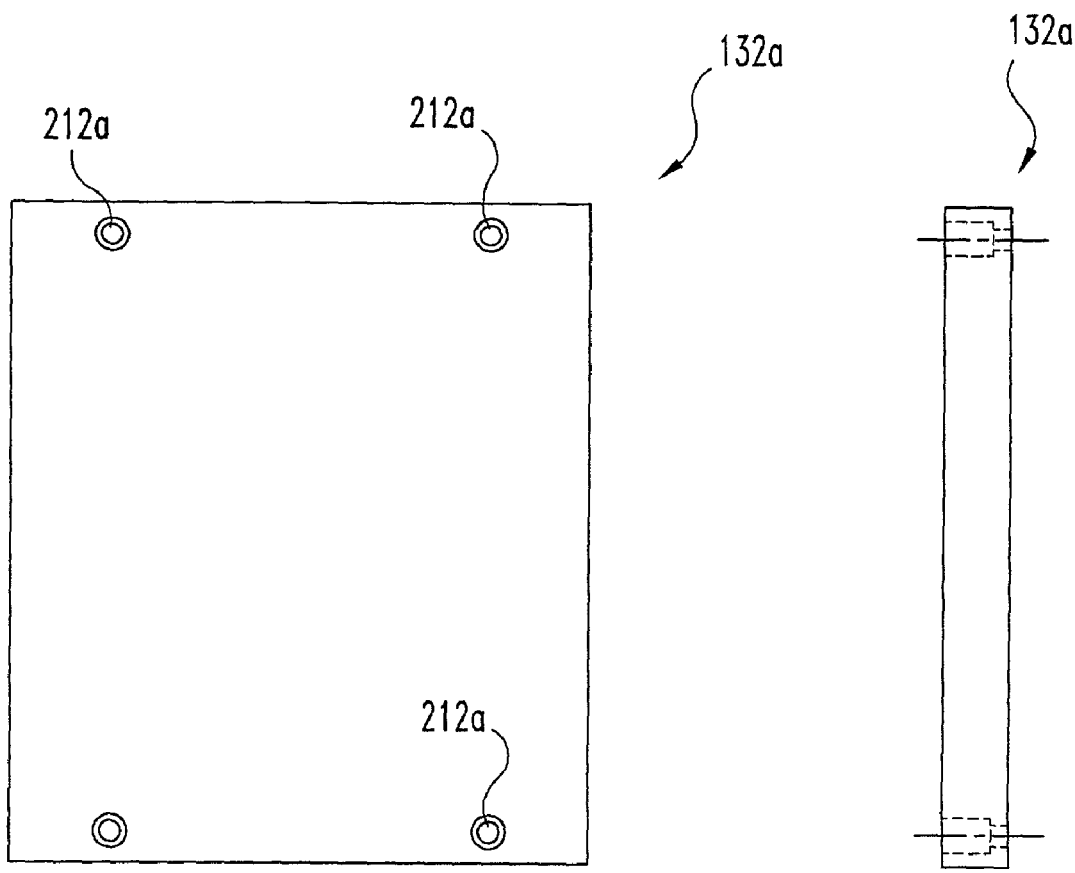
Fig. 6A  Fig. 6B

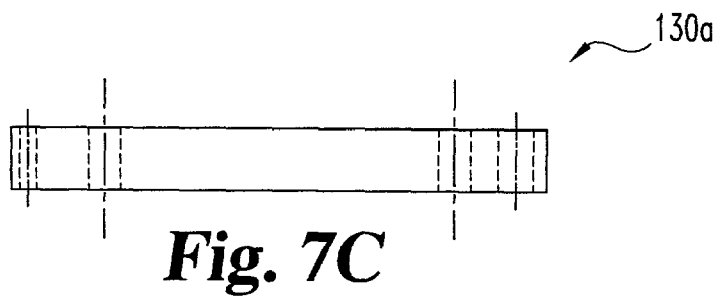
Fig. 7C
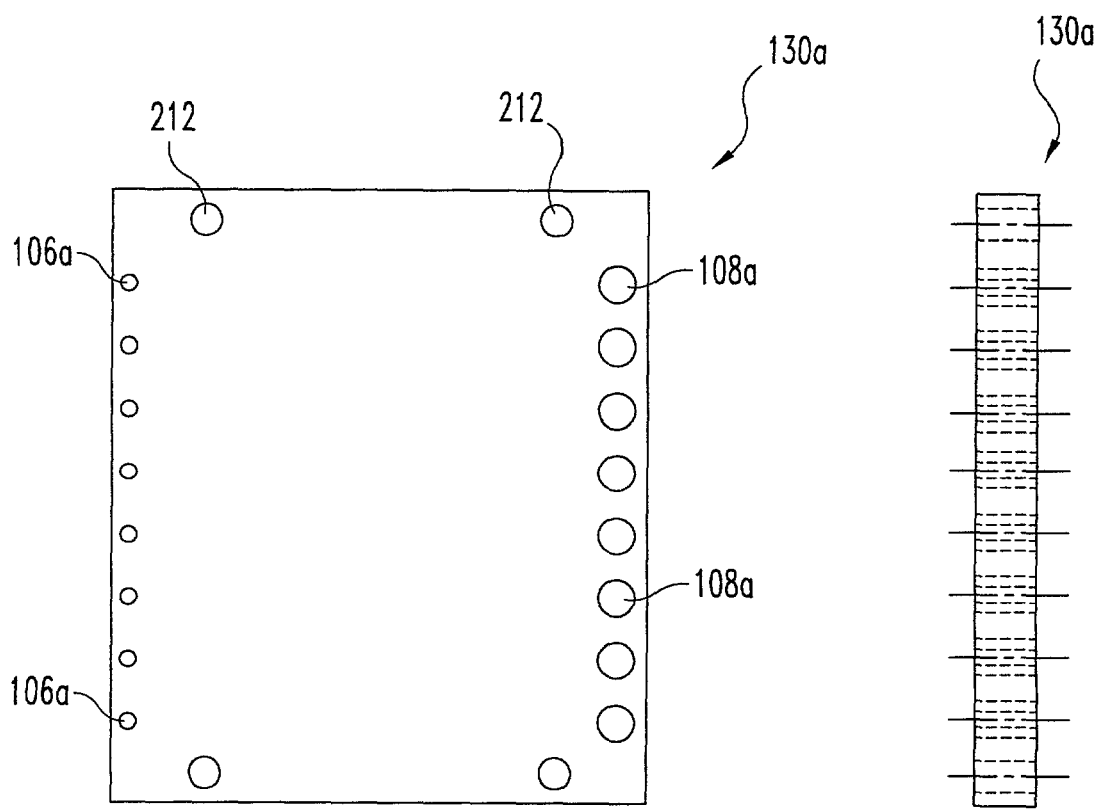
Fig. 7A  Fig. 7B

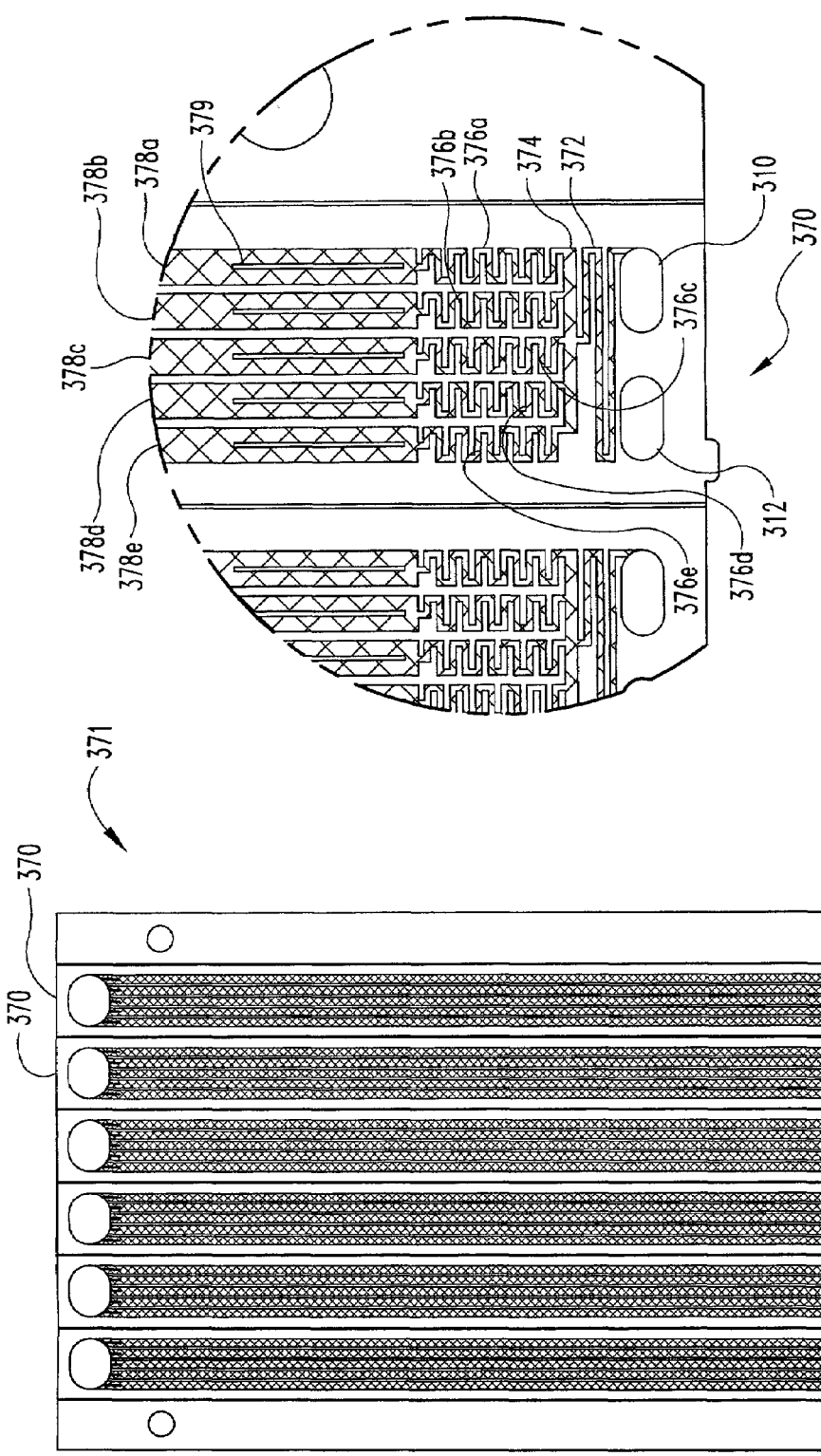

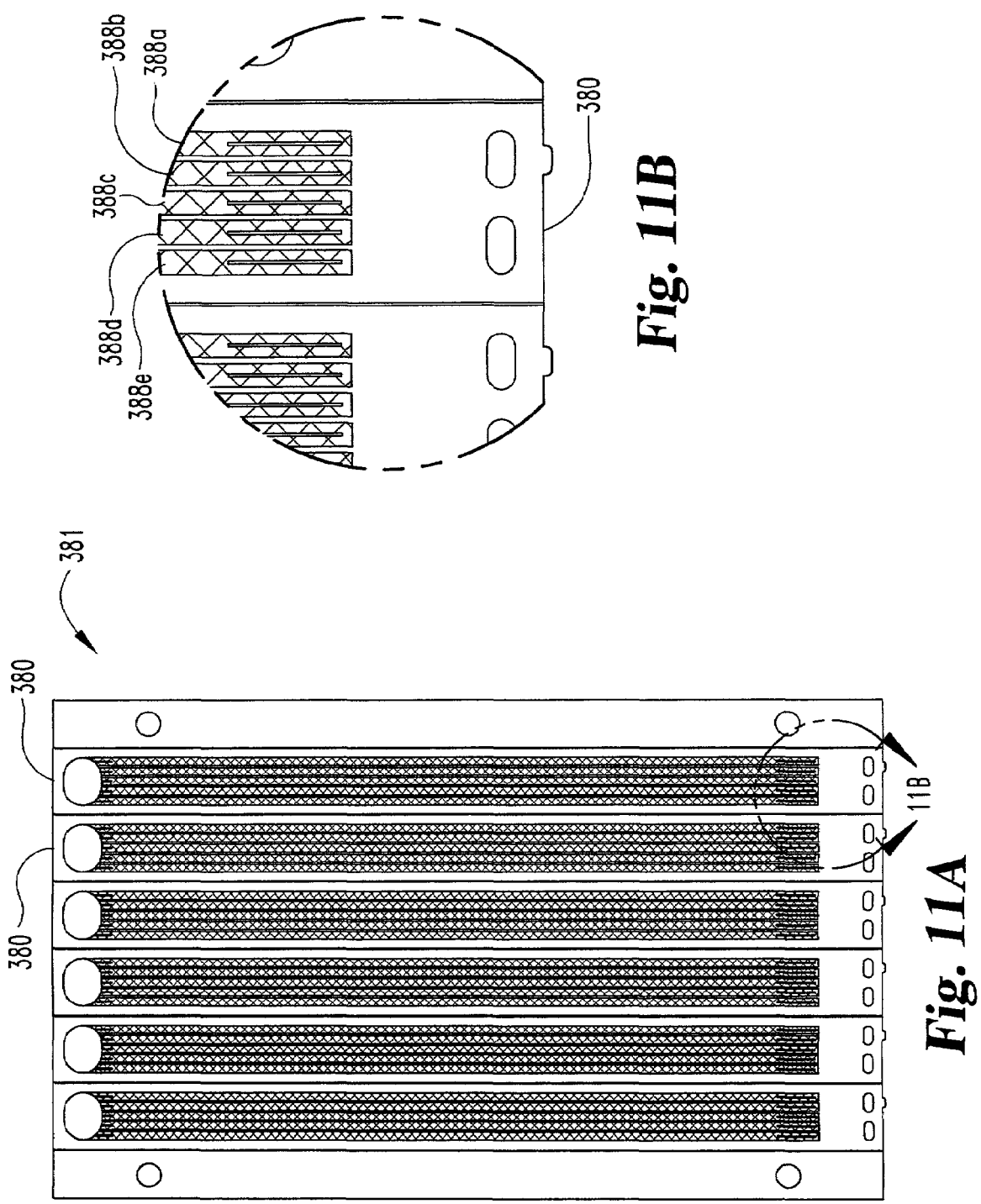

US 6,994,829 B2

FLUID PROCESSING DEVICE AND METHOD

RELATED APPLICATION DATA

This application claims the benefit of U.S. Provisional Application Ser. No. 60/296,295 filed Jun. 6, 2001, and U.S. Provisional Application Ser. No. 60/363,269 filed Mar. 11, 2002 the disclosures of which are hereby incorporated by reference.

GOVERNMENT RIGHTS

This invention was made with Government support under Contract Number DE-AC06-76RLO 1830 awarded by the U.S. Department of Energy. The Government has certain rights in the invention.

INTRODUCTION

The present invention is directed to a fluid processing unit and method of manufacture. More particularly, but not exclusively, the present invention is directed to a low pressure drop microchannel heat exchanger and a method of manufacture.

Light weight, small-scale, fluid processing units have been developed for a variety of applications, including military, automotive, and remote location uses to name just a few. However limitations are often encountered regarding the cost of operation and/or construction of such units. In particular, a need exists for a microchannel fluid processing system that can perform heat transfer with a low gas side pressure drop. A need also exists for a device that can transfer heat efficiently and in a compact package. A need also exists for a device that can reliably control the flow of fluids undergoing a phase transition in the device. A need also exists for a fluid processing system that can be manufactured in a cost effective manner. In particular embodiments, the present invention meets these or other needs.

BRIEF DESCRIPTION OF THE DRAWINGS

FIG. 1A is a side elevational view of a heat exchanger assembly of one embodiment of the invention.

FIG. 1B is a top plan view of the FIG. 1A heat exchanger assembly.

FIG. 1C is an end elevational view of the FIG. 1A heat exchanger assembly.

FIGS. 6A–6C are views of a bottom plate for forming a vaporizer element with the shim arrays of FIGS. 4 and 5 as described in Example 1.

FIGS. 7A–7C are views of a top plate for forming a vaporizer element with the shim arrays of FIGS. 4 and 5 and bottom plate of FIGS. 6 as described in Example 1.

FIG. 10A is a top plan view of a vaporizer side shim array according to still another embodiment of the invention with cross hatching indicating recessed portions.

FIG. 10B is an enlarged detail of a portion of the FIG. 10A array.

FIG. 11A is a top plan view of a vaporizer side shim array for use in conjunction with the FIG. 10A vaporizer side shim array with cross hatching indicating recessed portions.

FIG. 11B is an enlarged detail of a portion of the FIG. 11A array.

DESCRIPTION OF EMBODIMENTS

Figure 2:
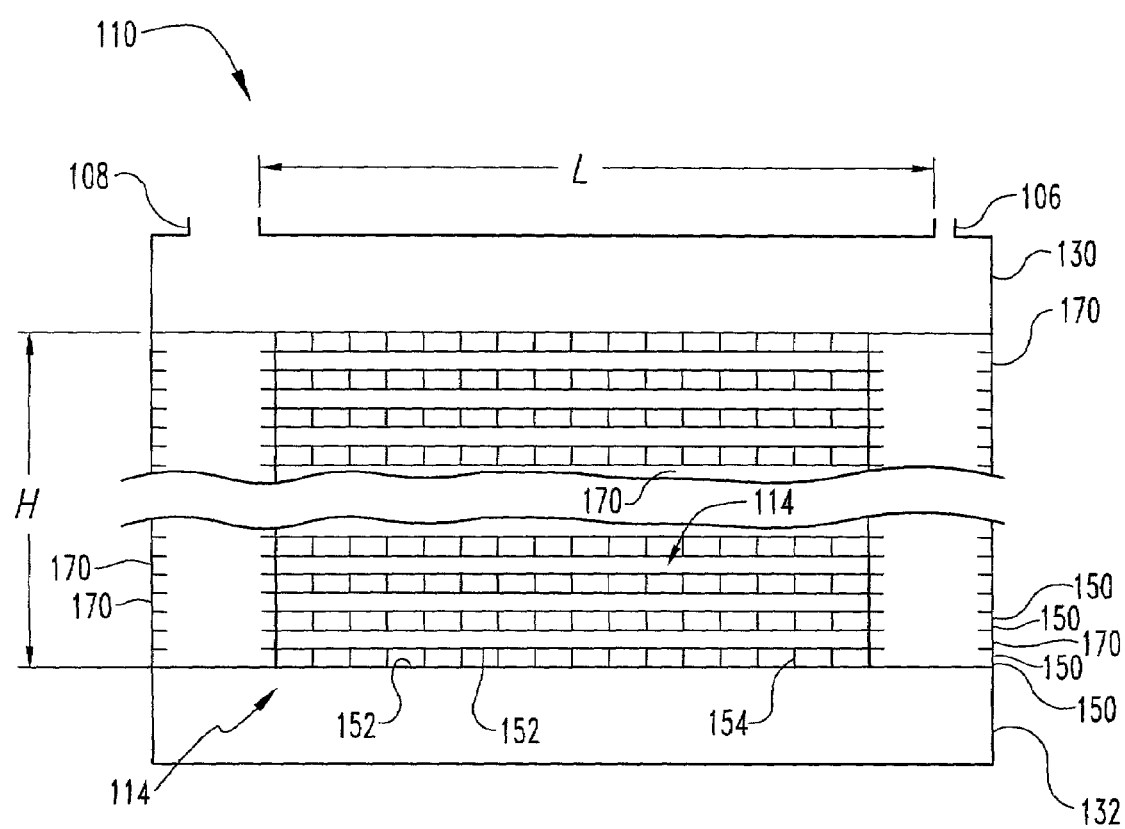
FIG. 2 is a side elevational view of a heat exchanger element for the assembly of FIGS. 1A–1C.

For the purposes of promoting an understanding of the principles of the invention reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated herein being contemplated as would normally occur to one skilled in the art to which the invention relates.

Turning now to FIGS. 1A–1C, a heat exchanger assembly 100 according to an embodiment of the invention is illustrated. Exchanger assembly 100 is configured to transfer heat between two fluid streams. More particularly, assembly 100 is configured to transfer heat from a gaseous stream to a liquid stream and to vaporize the liquid stream using a heat exchanger element referred to as a vaporizer. Even more particularly, in this exemplary embodiment, the hot gaseous stream includes combustion gas and the liquid stream includes water.

Exchanger 100 includes at least one combustion side gas inlet 102 feeding an inlet gas header 120 and a gas outlet header 122 feeding at least one gas outlet 104. The combustion side headers 120 and 122 are configured to direct the combustion gas through vaporizer 110, and may include diffuser elements or screens (not shown) to level the velocity profile on the gas side prior to entering the vaporizer 110. Headers 120 and 122 are bonded to the vaporizer perimeter 116 and are configured to generally evenly direct the combustion gas into inlet face 112 and out of outlet face 114 of vaporizer 110. Heat is then transferred from the combustion gas to the water and/or steam in the vaporizer 110 as the fluid flows from the water inlet 106, through the vaporizer 110, and out the steam outlet 108.

Turning now to FIG. 2, more particular features of vaporizer 110 are illustrated. Vaporizer 110 is formed as a stack of thin sheets or shims forming a microchannel fluid processing unit. Shims 150 are arranged in stacked pairs and shims 170 are alternately stacked between the facing pairs of shims 150. The array of stacked shims 150 and 170 are held between end caps 130 and 132 which form attachment points for the steam side inlet and outlet (106, 108) and for the gas side headers (120, 122). As described in more detail below, recessed areas in shims 150 form a plurality of combustion gas microchannels 152 (see FIG. 3A) extending through face 114 and allowing combustion gas to pass though vaporizer 110. Shims 170 are spaced between pairs of shims 150 and include water and steam microchannels 172 and 176 (see FIG. 3B) that convey the water and steam through length L and in a direction generally parallel to face 114.

As used herein, a microchannel is a fluid flow path that has at least one dimension (such as the depth) less than about 1000 micrometers, often less than 250 micrometers. The remaining dimensions of a microchannel (such as the length and width) can be any value, though the width typically ranges from about 250 to about 6000 micrometers. The flow length of a microchannel is referred to as the microchannel flow length.

Figure 3A:
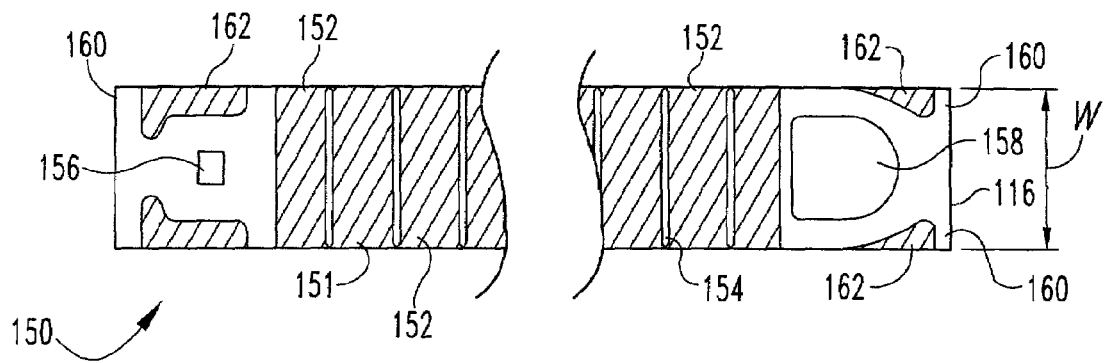
FIGS. 3A and 3B are top plan views of individual thin sheets stackable to form the heat exchanger element of FIG. 2.
Figure 3B:
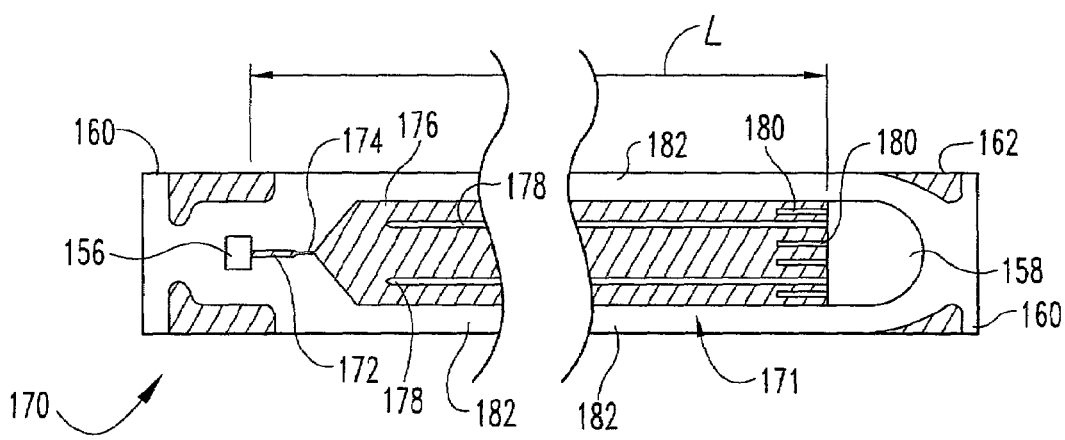

Referring now to FIGS. 3A and 3B, shim 150 is a generally rectangular thin piece (for example 0.5 inches wide, 4.5 inches long, and 0.015 inches thick) and includes a water header hole 156 and a steam header hole 158 near its ends. Holes 156 and 158 accommodate water and steam distribution and are of uniform size throughout vaporizer 110. Matching holes 156, 158 are also provided in shim 170. In alternative configurations holes 156 and 158 can be of progressively diminishing size for shims 150 and 170 with increasing distance from inlet 106 and outlet 108. The size reduction can be selected to reduce pressure variations related to velocity changes within the headers that are formed by the alignment of holes 156 and 158 in the shim stack.

As indicated by the shaded region of FIG. 3A, recessed portions are provided in shim 150 between holes 156 and 158. These recessed portions might be for example 0.01 inches deep. In the vaporizer 110, each of these recessed areas of shim 150 form at least part of three sides of a vapor microchannel 152 spanning the width W of the shim. As illustrated by the multiple distinct recessed areas, there are a plurality of parallel microchannels 152 adapted to convey a combustion gas. In the illustrated embodiment, microchannels 152 are oriented generally perpendicular to the line connecting the centers of holes 156, 158. In other embodiments microchannels 152 are within about 60 degrees of perpendicular (90 degrees) to this line. Each microchannel 152 is separated by thin non-recessed support portion 154 tapered at the entrance and exit to the channel 152. Supports 154 have a width about equal to the depth of the recessed portions (approximately 0.01 inches). The supports are spaced sufficiently close to one another to support loads experienced during manufacture and use. Where, as described below, a diffusion bonding procedure is employed to bond the stacked shims, the supports are spaced sufficiently close that a good diffusion bond is achieved between the shim 170 and the back of shim 150 in order to prevent leakage of steam into the combustion gas. One spacing that has been determined to work satisfactorily is about 0.090 inches.

Shim 170 is also a generally rectangular thin piece and includes water and steam holes 156 and 158. Shim 170 also includes a recessed steam and water channel 171 running between holes 156 and 158. Water portion 172 communicates with steam portion 176 through orifice 174. The orifice 174 can be a very small laser machined recessed area added after the shim is manufactured. As discussed further below, in addition to or in place of orifice 174, water portion 172 of channel 171 can have an elongated flow path, for example configured as a serpentine channel. Steam portion 176 is substantially wider than water portion 172, for example about 15–20 times wider, to accommodate the increased volume of the vapor relative to the liquid. Steam portion 176 also includes support ribs 178 running the length of the steam microchannel with additional supports 180 provided near the steam outlet hole 158. While shim 170 can be the same or different dimensions than shim 150, in a preferred embodiment shim 170 is the same length and width and is slightly thinner than shim 150 (for example being only 0.01 inches thick with recessed portions recessed 0.005 inches).

Figure 3C:
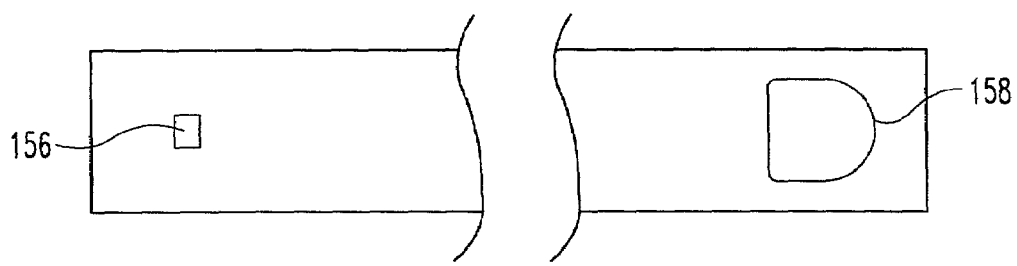
FIG. 3C is a bottom plan view of the thin sheets of FIGS. 3A and 3B.

The underside of both shims 150 and 170 is substantially flat as depicted in FIG. 3C. As described above, during formation of the vaporizer 110, a pair of shims 150 are placed face to face such that microchannels 152 and supports 154 align, forming a single enlarged channel, with pairs of shims 150 alternating with shim 170. In use, heated fluid flowing through microchannels 152 transfers heat through the floor 151 (or ceiling) of microchannel 152 and into shims 170. This heat transfer occurs generally perpendicular to the plane of the shim and to the bulk flow direction in the microchannels 152. In other words, there is a heat conduction pathway directly from the gas, through the floor 151 (or ceiling) of channel 152 and into the steam portion 176. In certain embodiments, this heat conduction pathway can be considered the primary heat conduction pathway and is defined by that portion of the floor 151 (or ceiling) that overlays the steam portion 176 of shim 170.

In one aspect, one or more additional heat transfer pathway also exists. This additional pathway includes the perimeter 182 of shim 170 and that portion of the channel floor 151 overlaying perimeter 182 on both the inlet and outlet sides of the vapor channel portion 176. Heat is transferred from the gas flowing through channels 152, through the floor 151 (or ceiling) and into the material of perimeter 182. Heat then transfers from the perimeter 182 into the fluid in channel 171. In this heat transfer path, which can be considered a secondary heat conduction pathway, perimeter 182 acts like a heat transfer fin to increase the available heat transfer area on the combustion gas side and to conduct heat into the fluid in channel 171. It is to be understood that this fin is formed by the perimeter 182 of shim 170 as well as that portion of the floor 151 of shim 150 in contact with perimeter 182. This fin is generally flat and extends from the primary heat transfer surface (the floor 151 overlaying portion 176 described above) in a direction generally parallel to the flow direction of fluid in microchannels 152. The length of this fin, defined as the width of the perimeter 182, is greater than or substantially greater than the smallest dimension of the vapor or steam microchannel 176, for example at least 2, 5 or 10 times the smallest microchannel dimension. In one aspect, the fin is within an order of magnitude of the second smallest dimension (the width) of the vapor microchannel 176. In one embodiment, where the steam channel portion 176 is about 0.3 inches wide, perimeter 182 is about 0.1 inches wide and the same thickness as the remainder of shim 170.

It is to be understood that when both the primary and secondary heat conduction pathways described above are present, fluid (for example hot combustion gas) passing through the microchannels 152 pass over a first extended surface, then the primary heat transfer surface, then a second extended surface. As described more fully below, the vaporizer 110 is formed as a stack of thin sheets or shims and each of the heat transfer surfaces, primary and secondary, are planar. In other embodiments, each of the heat transfer surfaces, primary and secondary, can be roughened or curved. In the illustrated embodiment, each of the extended surfaces (secondary heat transfer surfaces) are parallel to the primary heat transfer surface. In other embodiments the heat transfer surfaces can be oriented at relative angles of each other within a few degrees of parallel (180 degrees), for example within 45 degrees, within 30 degrees, or within 10 degrees of parallel.

The ratio of the heat transfer area provided by the extended surfaces relative to the total heat transfer area (the extended surfaces plus the primary heat transfer surface) can be any value. Exemplary values range from about 10% to about 75%, for example between 30% and 50% of the total heat transfer area provided by the extended surfaces. One satisfactory value is about 33%.

One or more of microchannels 171 or 152 can optionally be a macroscale flow path. Preferably, the flow path is of small size, for example having a smallest dimension less than about 1 cm or less than about 1 mm. In one aspect the smallest dimension of at least one of the flow paths (for example 171 or 152) is selected such that the Reynolds number of the flow in that flow path is less than about 3000, for example less than 2000, or less than 1000, or less than 500. The Reynolds number (Re) is proportional to the ratio of the inertial force to the viscous force of the flowing fluid and is conventionally defined as Re=D v rho/mu, where D is the characteristic length of the flow path, v is the velocity of the flow, rho is the density of the fluid, and mu is viscosity of the fluid. As used herein, the characteristic length D is the hydraulic diameter, where the hydraulic diameter is conventionally defined as 4 times the area of the cross section of the flow divided by the wetted perimeter. For a filled rectangular pipe or duct, the hydraulic diameter is equal to 2ab/(a+b), where a and b are the sides of the rectangle. Flows having a Reynolds number based on the hydraulic diameter less than about 3000 are conventionally laminar flows, though laminar flows can persist at Reynolds numbers over 10,000 depending on the amount of background turbulence at the entrance to the flow channel. In another aspect, the dimensions of the flow paths (171 or 152) is selected such that laminar flow occurs in at least a portion of both of the different flow paths, such as in a substantial portion of the liquid flow portion of the vaporization channels and throughout a substantial portion of the gas side flow paths. It is to be understood that where there is a phase transition (vaporization) there is multiphase flow, which is typically not characterized as laminar flow. This multiphase flow will likely occur near the beginning of the enlarged vapor flow portion of the vaporizing flow paths.

In another aspect, the width W of shim 150, and more particularly the length of the vapor side microchannels 152, is much less than the length L of the water/steam microchannel. In this aspect the pressure drop on the vapor side can be maintained at a low level. For example, the width W can be maintained less than about 40% or less than about 25% or less than about 12.5% of the length L. More preferably, the flow path distance of microchannel 152 is maintained substantially less than the length of the steam portion 176.

Where the combustion gas microchanels (152) are relatively short, as described above, the vapor side pressure drop can be maintained at a low level without sacrificing heat transfer density. For example efficient operation can occur at a pressure below about 10 inches of water when operating near ambient (local atmospheric) pressure. As another example, operation at ambient pressures with an absolute pressure drop less than about 5 inches of water more preferably less than about 2.5 inches of water, and most preferably less than about 1 inch of water can still satisfactorily provide useful heat transfer densities and/or efficiencies. Examples of operation near ambient pressures include operation in systems where the combustion gas outlet vents to the atmosphere, either directly of after some degree of downstream processing. The pressure drop through the vaporizer 110 in such as system may be provided by a fan or blower.

Operation in pressurized environments are also contemplated, and it is to be understood that the absolute pressure drop through the device will be a function of the absolute pressure. Considering for approximation a fully developed laminar flow of an ideal gas, the absolute pressure drop on the gas side will scale roughly inversely proportionally to the absolute pressure in the gas. Accordingly, if the vaporizer 110 operates at one efficiency at a pressure drop of 10 inches of water at about 1 atm, similar performance can be achieved at a pressure drop of about 5 inches of water in a system pressurized to about 2 atm. Thus, in one aspect, the device operates with an absolute pressure drop across the panel measured in inches of water less than about 10 times the inverse of the absolute pressure (measured at the inlet face) measured in atmospheres ($dP < 1/P_{abs}$). As the absolute value of the pressure drop through the microchannels 152 is generally proportional to the length of the microchannels 152, the width W can usefully be maintained less than about 2 inches, or less than about 1.5 inches, or between about 0.3 and about 1 inch.

In another aspect, vaporizer 110 has a relatively large cross sectional area at faces 112 and 114 for accommodating the gas flow, where faces 112, 114 encompass that portion of the vaporizer through which combustion gas flows. For example, faces 112 and 114 can be square or rectangular with a length and/or a width several times greater than the thickness T of the vaporizer 110, for example 5–10 times greater. Optionally the length and width of a face 112 or 114 can be within about 50% of each other. In the illustrated embodiment, the thickness of the vaporizer T is equal to the width W of an individual shim 150, 170.

In another aspect, the vaporizer 110 has a length L that is greater than the height of the interleaved microchannels. In the illustrated embodiment, the height of the interleaved microchannels is the height H of the shim stack as illustrated in FIG. 2, which is one of the dimensions of the faces 112, 114. In this aspect, the vaporizer 110 is elongated in the length direction (L) to increase the physical separation between the liquid inlet 106 and the steam outlet 108. In this aspect the length L to height H ratio L/H is substantially greater than 1, for example 1.5, 2, 2.5, 3 or more. For a given thickness T for vaporizer 110, increasing the length to height ratio (L/H) decreases the cross sectional area (H×T) available for longitudinal heat conduction (in the length L direction.) In one aspect, the cross sectional area available for longitudinal heat conduction is selected to prevent premature vaporization of liquid in the liquid channels 172, 172a prior to the liquid reaching the vapor channels 176.

It is to be understood that individual shims may be made from any material compatible with the operating conditions of the system. Typically, elevated temperature and/or pressure require the use of a metal, for example copper, stainless steel, or high nickel alloys such as inconel. For metals, a preferred shim cutting or recesses forming method is photochemical etching. This patterning process has the capability to produce shims having highly complex patterns with no surface burring. Other patterning processes such as laser machining, electrochemical machining or stamping can also be used for producing shims for specialized applications or in mass production.

The endblocks or endcaps 130, 132 used to sandwich the stacked shims 150, 170 and provide fluid interconnects are machined on a per-piece basis which may be automated for producing a stacked device in large quantities. Patterned shims are cleaned, preferably vapor degreased, prior to assembly to remove residual photoresist from the patterning process and any other organic contaminants. Moreover, any one or more of the shims 150, 170 can be formed as a series of stacked plates, for example as described in U.S. Pat. No. 6,192,596 to Bennett et al. which is hereby incorporated by reference.

Bonding of stacked shim/endblock assemblies into a single solid piece made of metal may be a high temperature/high pressure diffusion bonding process under a vacuum. Assemblies of stacked shims can be placed into a preoxidized high temperature alloy clamping device to provide alignment and side support. Bonding may then be accomplished in a vacuum hot press. An alloy endplate (such as a molybdenum alloy) and ram extension are used to transmit pressure from the hot press ram to the stacked sub-assembly. For stainless steel, bonding conditions may be 920 degrees Celsius and 4000 pounds per square inch for 4 hours. Of course, one skilled in the art will recognize that diffusion bonding may be done under various conditions inasmuch as diffusion bonding is a time, pressure, and temperature variable process. For example, other conditions might be temperatures up to 950 degree C. and pressures up to 3000 psi for up to 8 hours.

An alternative diffusion bonding process avoids an external ram. The ramless process relies upon a positive difference between thermal expansion coefficients of the sub-assembly material compared to the clamping device material to produce the pressure required for bonding at elevated temperature. Ultrasonic bonding processes may also be used. Alternatively, metal bonding includes but is not limited to diffusion brazing, hot isostatic pressing and combinations thereof.

Various coatings may also be applied to assist bonding of the shims. For example, electroless nickel plating can be performed in conjunction with the diffusion bonding for bonding stainless steel shims. In this procedure, the metal surfaces to be bonded are first exposed to a nucleation agent. One nucleation agent that can be used is a stannous chloride solution (SnCl2). Next the surface is exposed to a solution of a reducing agent and a nickel salt to deposit a thin layer of metallic nickel onto the surface. Possible choices include a sodium hypo-phosphite (H2NaPO2) as reducing agent with NiCl2 as the salt. The entire process occurs at a temperature of about 70° C. In other embodiments other types of plating may be performed under various conditions and with other reagents.

When bonded in a diffusion bonding procedure, each of shims 150 and 170 are preferably provided with recessed portions 162 to form tabs 160 at opposing ends. Being in contact with the adjacent shim tabs 160, tabs 160 will bond to each other during the diffusion bonding procedure whereas portions 162 will not. When used as welding or attachment portions for mounting the vaporizer 110 into the vapor header portions, any stresses imposed by mounting or welding can be confined to the tabs 162 and will not be readily transmitted throughout the shim stack. Accordingly, any associated deterioration of the diffusion bond caused by mounting or handling can be confined to the sacrificial tabs 160, and will not be readily propagated to connections around the openings 158 and 156.

Particularly when used in low vapor side pressure drop applications, the vapor side headers 120 and 122 can be attached with a metal to metal non-sealed fit along the shim edge 116 and/or at tabs 160. Any leakage through such a non-sealed joint would be very small due to the low pressure drop across the vaporizer 110. In addition, as long as the leak path is maintained smaller in dimension than the microchannels 152, any leak path acts as additional gas side heat transfer area. In addition, if in operation the static pressure on the gas side is low, then the gas side headers 120 and 122 can be constructed from much thinner materials than would be required within the diffusion bonded structure where high steam pressures may need to be contained.

In another aspect, the vaporizer 110 is formed at least in part in conjunction with other vaporizers 110. Turning now to FIGS. 4A and B, an array 201 of interconnected shims 250 are depicted. Shims 250 are identical to shims 150 save that channel 152a is provided with projections 154a extending into channel 152a. Projections 152a reduce the gaseous flow through channel 152a and reduce the heat transfer through that channel, which in the formed vaporizer would be positioned adjacent water portion 172a. Reducing the heat transfer into water portion 172a can help prefent premature vaporization of the fluid in water portion 172a. Shims 250 in array 201 are separated by a thin recessed region 205 that is recessed to the same depth as the microchannels 152 and 152a. Alignment holes 212 are provided in the metal portions 210 and 220 bounding the array 201 of eight identically configured shims 250.

Figure 5B:
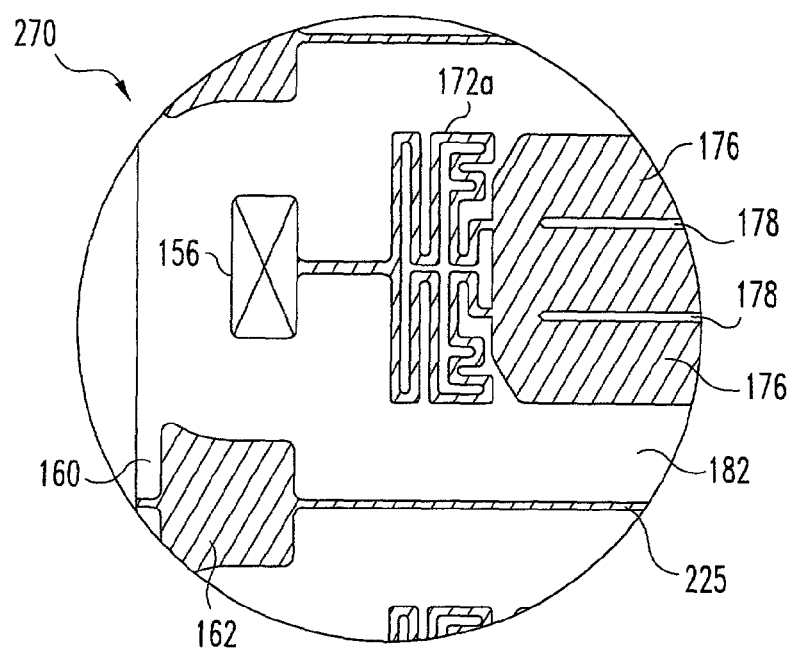
FIG. 5B is an enlarged detail of a portion of the FIG. 5A array with cross hatching indicating recessed portions.
Figure 5A:
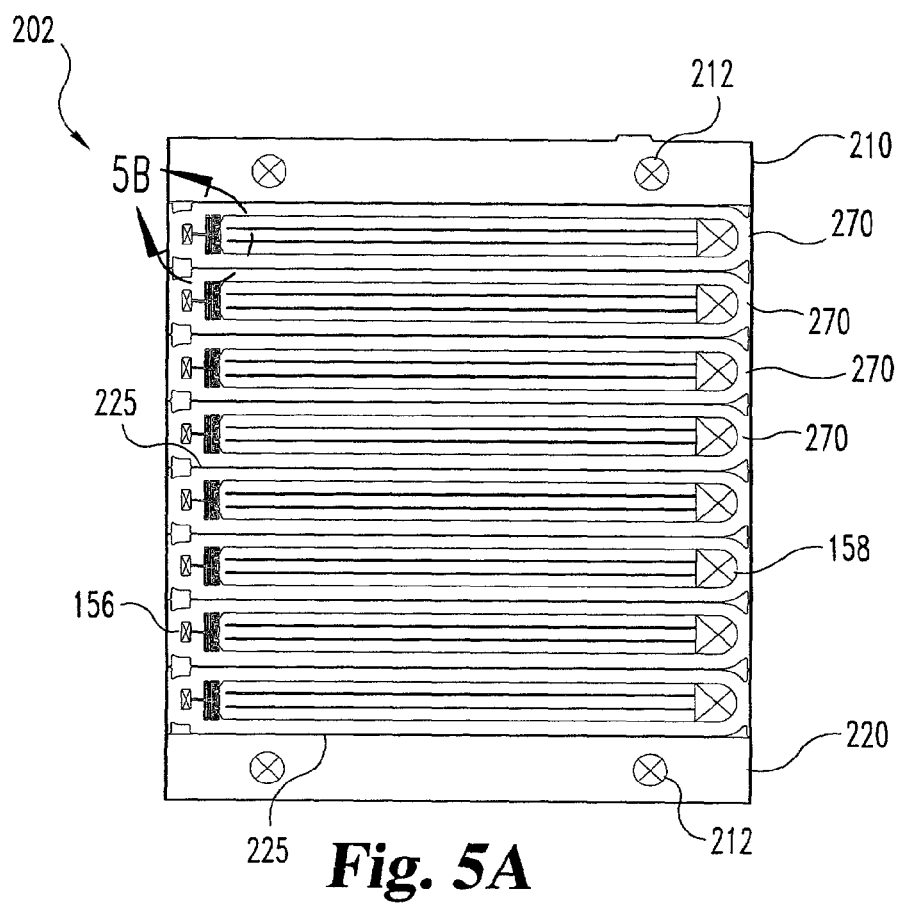
FIG. 5A is a top plan view of a shim array according to still another embodiment of the invention with X's indicating through holes.

FIGS. 5A and 5B illustrate shim array 202 which include the steam and water shims. Shims 270 are identical to shims 170 save that liquid portion 172a includes a serpentine channel and there is no orifice between portion 172a and portion 176. More particularly, vapor portion 172a includes a pair of corresponding serpentine or tortuous channels of generally constant size (cross section) along their flow lengths where the size of the serpentine channels is substantially smaller than the size of the vapor portion 176. The serpentine channels are distinct along their flow lengths and feed into a common vapor portion 176. The flow length of the liquid portions 172a are selected to maintain the appropriate pressure drop for the liquid flowing through portions 172a, where a serpentine pattern allows a longer flow length per unit length of the shim 170. In one aspect, the tortuous flow paths define a number of turns each greater than about 60 degrees, for example at least 3, 5, or 10 turns. In the illustrated embodiment, liquid portion 172a includes 16 turns of 90 degrees, where a single 180 degree turn is considered to be composed of a pair of 90 degree turns in the flow path. Array 202 also includes metal portions 210 and 220 with alignment holes 212 at the ends, and individual shims 270 are separated by recessed portion 225.

These tortuous flow paths, which may be included in the etching, stamping or coining operation used to make the shim, create a pressure drop due to the liquid-phase flow.

This pressure drop is non-negligible compared to the pressure drop in the vaporizing section of the vaporizer channel. In one aspect the pressure drop through the tortuous channel is at least about equal to or substantially greater than the pressure drop through the wider vapor flow section of the vaporizer channel. The effect of the pressure drop in the tortuous channels at the entrance to each shim is to prevent unstable flow oscillations occurring between different levels of the device (i.e. between the vaporizing channels 176 located at different heights within the stack) that would otherwise lead to poor flow distribution and result in poor heat exchanger performance. A result of poor flow distribution would be a pulsing or unsteady flow of vapor from the device.

One traditional approach to avoiding the problems of flow mal-distribution is to feed substantially more liquid than can actually be vaporized to assure that all channels in a vaporizer have sufficient water regardless of flow mal-distribution. However, this traditional approach requires that steam superheating be performed in a separate unit because all steam exiting the device would be saturated due to the excess liquid feed. In addition, feeding excess liquid dampens the transient response—especially when attempting to maintain vapor rate during a change in system pressure which typically requires separation and recycle of the unvaporized liquid. In one aspect, the present invention prevents flow mal-distribution by establishing a substantial pressure drop in the liquid portion at the entrance to the vaporization channels. In this aspect, the present invention avoids the need to feed excess liquid, facilitating a rapid transient response and allowing vaporization and superheating to be performed in a single unit. In other embodiments, the present invention is operated by feeding excess liquid and/or without superheating the vaporized liquid.

Figure 8:
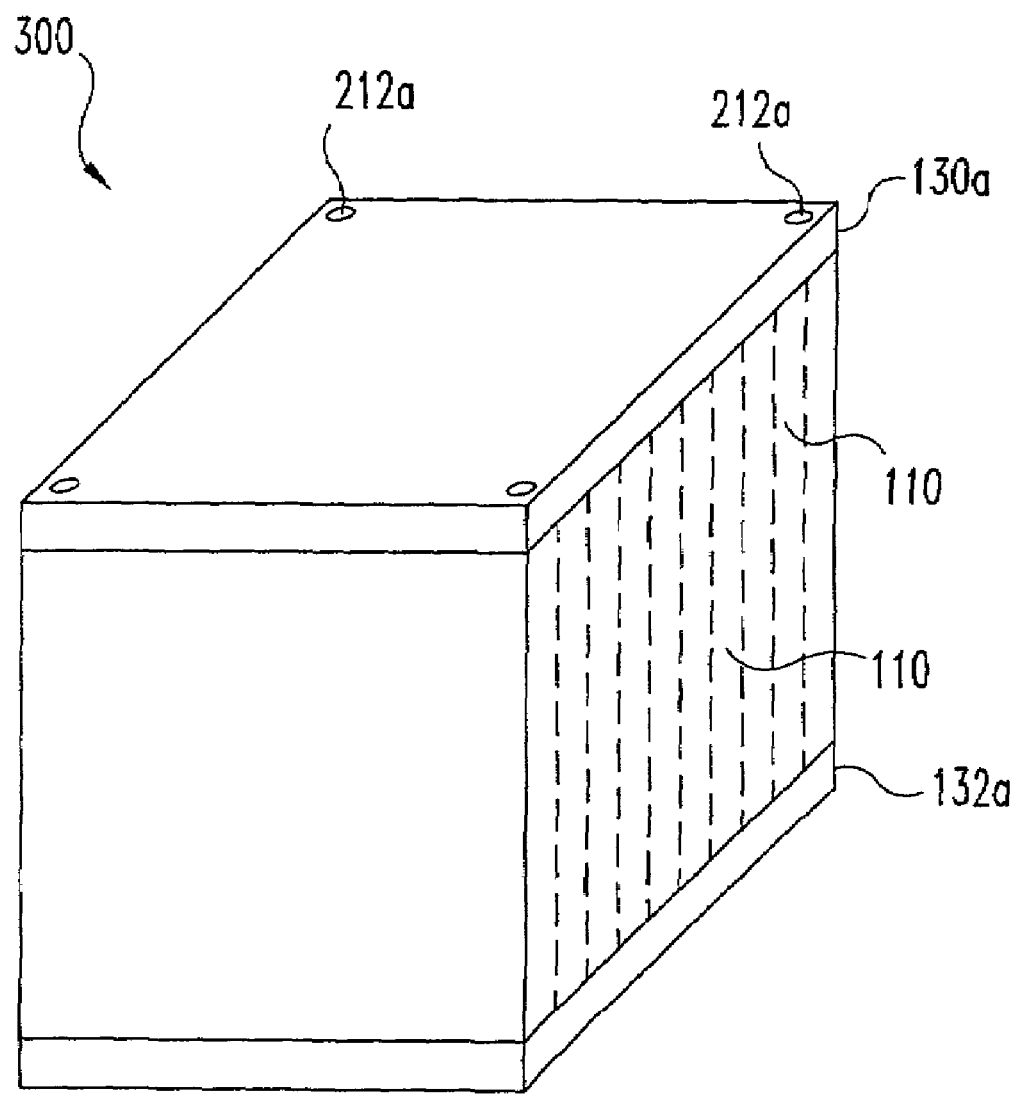
FIG. 8 is a stacked block prior to separation into individual vaporizer elements.

To assemble a stack, pairs of facing shim arrays 201 are alternatively stacked between shim arrays 202, beginning and ending with a facing pair of arrays 201. The endpiece 132a (see FIG. 6) includes a receiving post 212a for alignment with the alignment holes 212 of the shim arrays 201 and 202. After forming a stack of, for example 120 shim sets, the top plate (see FIG. 7) is attached to form a block 300 (see FIG. 8). The entire block 300 can then be diffusion bonded in a single bonding. Individual vaporizers 110 are then separated from the stack by cutting along the boundary between vaporizers 110.

One approach for diffusion bonding the block 300 is to use an external ram to apply pressure to the block 300 under conditions described above. Where block 300 has sufficient structural rigidity to withstand the pressures of the ram without deformation, for example as constructed in the illustrated embodiment, side supports will typically be unnecessary.

The provision of shims in arrays 201 and 202 to form a bonded stack 300 provides several advantages. Time and wasted metal are reduced compared to individual formation methods. In addition, the structural rigidity of any individual vaporizer 110 is increased by the stack configuration to help it withstand the rigors of diffusion bonding, allowing the formation of vaporizer elements that are tall and wide but not thick. For example vaporizer 110 can be formed 5 inches wide and tall, yet only 0.5 inches thick.

One technique to perform the vaporizer separation from the stack is wire EDM. Having been previously provided with recessed or etched portions 225 and 205 that extend to the end of each shim, an operator can utilize the visible portions of etched portions 225 and 205 to help align the cutting wire to assure accurate separation of individual vaporizers 110. The width of portions 225 and 205 can be selected to correspond to the cutting dimension of the cutting wire to further minimize the amount of wasted metal. In addition, when recessed portion 205 between shims 160 is cut with wire EDM, a generally rounded profile at the entrance to the vapor channel 152 results. By avoiding sharp edges at the entrance and exit to channels 152 the pressure drop attributable to the transition region effects can be further reduced.

Alternative shim materials including but not limited to plastics, ceramics, glasses, carbon fiber composites, and combinations thereof may be used with corresponding bonding techniques. For example a ceramic of alumina alternately stacked with alumina silicate green tapes bonds upon firing. Plastics may be heat bonded or glued. Because the bonded vaporizer 110 acts as a solid piece of material, additional machining may be performed on the laminated parts after bonding. Such machining may be desired to achieve smooth surfaces for o-ring or gasket seals, to provide additional fluid inlet or outlet ports, to reduce the overall mass of the resulting part, or for aesthetics. In the preferred embodiment, the endcaps 130, 132 for vaporizer 110 are machined to a thickness of approximately 0.1 inch prior to installation in assembly 100. Material compatible tubing may be attached to the fluid inlet and outlet ports of the vaporizer 110 after bonding. For metals, brazing or welding are preferred methods of making sealed connections. This connection method takes up much less surface area on the finished part and requires less material depth than other connection methods such as machined fittings.

Figure 9B:
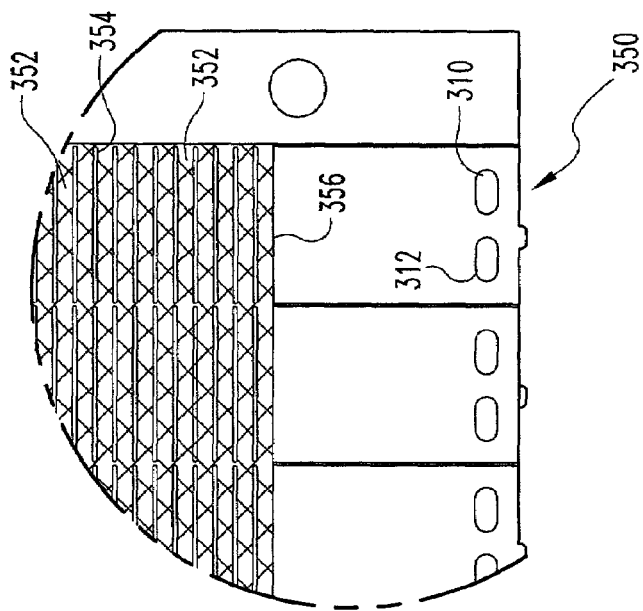
FIG. 9B is an enlarged detail of a portion of the FIG. 9A.
Figure 9A:
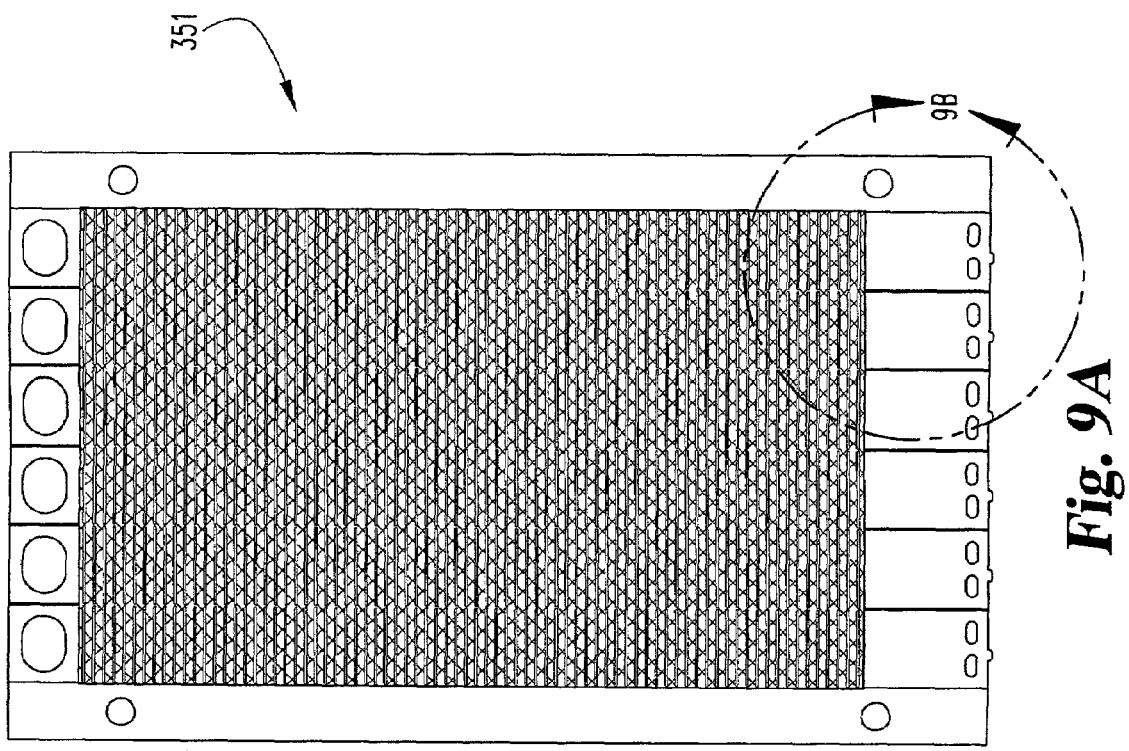
FIG. 9A is a top plan view of a gas side shim array according to still another embodiment of the invention with cross hatching indicating recessed portions.
Figure 12:
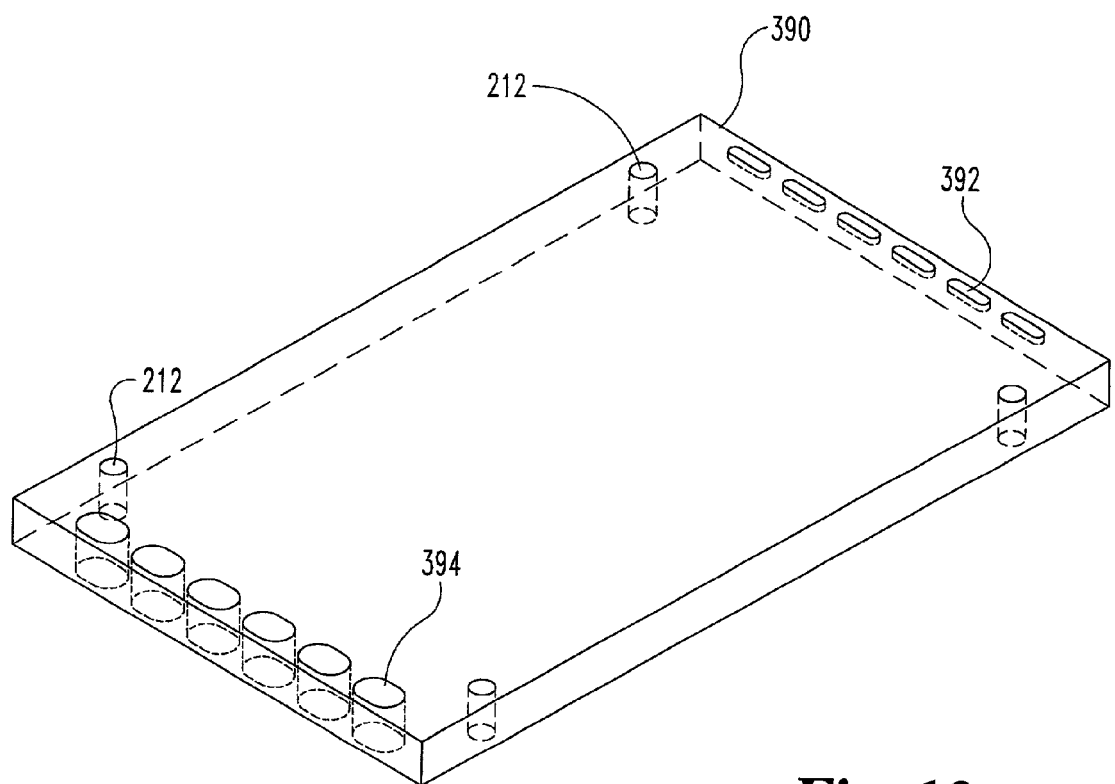
FIG. 12 is a perspective view of an endplate for forming a vaporizer element with the shim arrays of FIGS. 9A–11B as described in Example 5.
Figure 13:
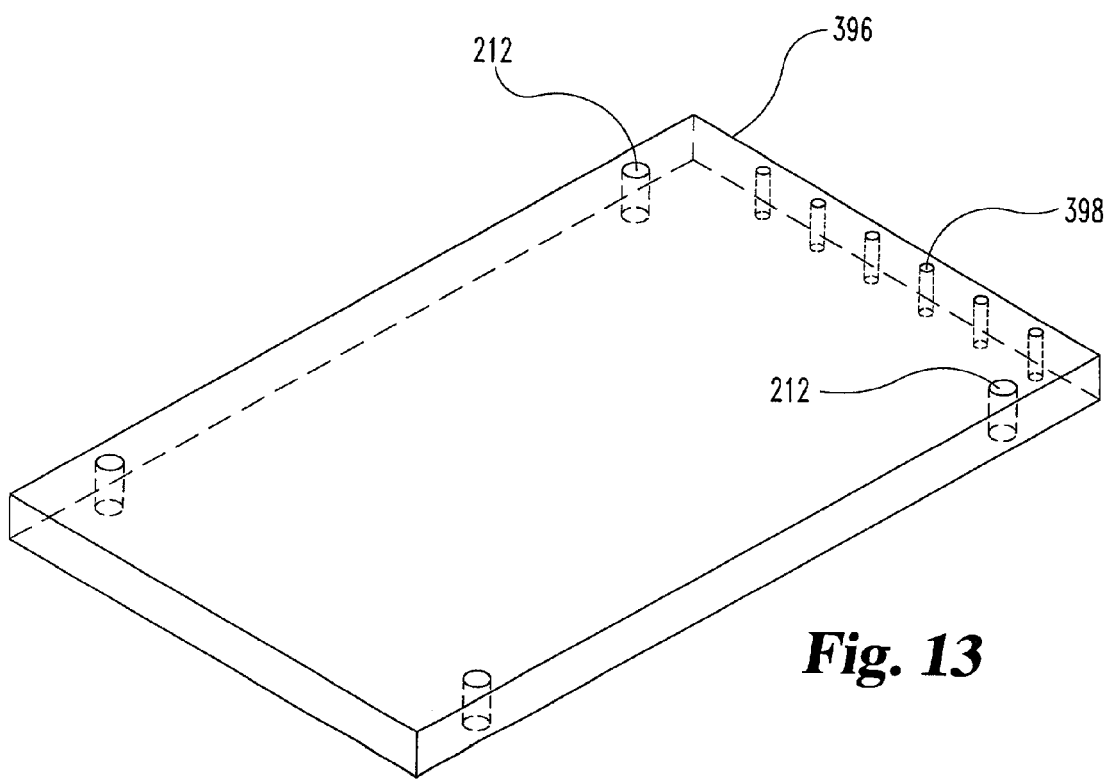
FIG. 13 is a perspective view of an endplate for forming a vaporizer element with the shim arrays of FIGS. 9A–1B as described in Example 5.
Figure 14:
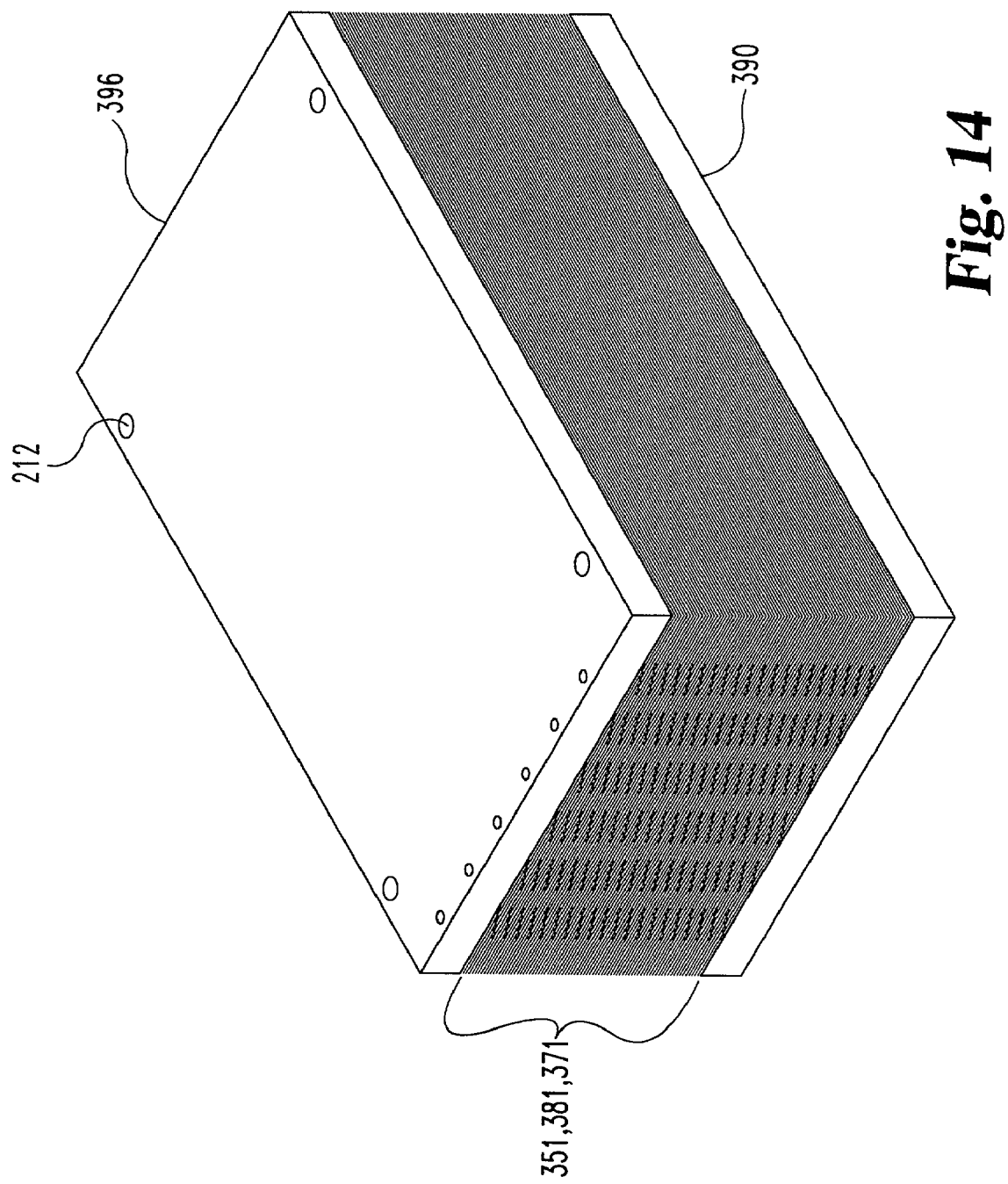
FIG. 14 is a stacked block of the shim arrays of FIGS. 9A–11B with the endplates of FIGS. 12–13 prior to separation into individual vaporizer elements.

Shim patterns for forming another vaporizer according to the present invention are depicted in FIGS. 9A–11B. In this vaporizer, facing pairs of the shim 350 of FIGS. 9A and 9B are used to form the gas side microchannels. The shim 370 of FIGS. 10A–10B facing the shim 380 of FIGS. 11A–11B together form the vapor side microchannels. The shims are provided in multiple shim sheets 351, 371, 381 respectively that are interleaved and provided between endplates 390 and 396 with the vapor outlet holes aligned with vapor outlet header hole 394 of plate 390 and with the first liquid inlet holes 312 aligned with the liquid inlet header hole 398 of plate 396. The shim stack is then bonded and separated into individual vaporizer elements as described above. As compared to FIG. 1A, in this configuration the inlet 106 and outlet 108 would be on opposing sides, rather than the same side, of the device.

The vaporization microchannels include a liquid flow portion and a vapor flow portion having a cross sectional area substantially greater than the cross sectional area of the liquid flow portion. The liquid flow portion includes tortuous channel 372 in communication with liquid inlet through hole 310. Channel 372 leads to a microchannel header portion 374 in communication with a plurality of tortuous channels 376a–376e in parallel flow arrangement. The tortuous channels 376a–376e are each in communication with corresponding vapor flow portions 378a–378e which have additional supports 379 near the junction between channels 376 and channels 378. Vapor flow portions 378a–378e are distinct from each other along the length of shim 370 and open into a common vapor outlet header hole. Shim 380 includes vapor flow portions 388a–388e that correspond to portions 378a–378e of shim 370 to provide additional cross sectional area for the vapor flow portions of the vaporization microchannels. Shim 380 has an unetched flat area that covers the liquid flow portions 372, 374, and 376a–376e of shim 70.

As noted above, each of the shims 370, 380, 350 include a second liquid inlet hole 310. Holes 310 and 312 are distinct on each shim with endplate 390 including a channel 392 to provide fluid communication between the two holes 310, 312. Also as noted above, it is the second hole 310 that is in communication with the vapor microchannels 378a–378e on shim 370 whereas the first hole 312 is in communication with the liquid inlet holes 398 on the endplate 396. Accordingly, when assembled, the liquid inlet to the vaporizer first passes through all the holes 312 before being provided into holes 310 for distribution to each of the vaporizing shims 370. Therefore, a full stream of the inlet liquid passes through each of the shims 370 prior to any of the liquid being provided to the vaporizing microchannels 378a–378e. As the inlet liquid would be relatively cool, this provides a means to cool the liquid end of the shim 370 to help prevent premature vaporization or undesirable temperature variations between the shims 370. Increased cooling can be provided by making additional passes of the inlet liquid in similar fashion.

Another mechanism for preventing premature vaporization of the liquid, which includes vaporization of the liquid while it is still in the liquid flow portions 376a–376e, is to avoid directly heating the liquid in the liquid flow portions. In this aspect, which can be used in conjunction with or without the multi-pass self-cooling liquid feed described above, the gas side microchannels 352 are absent from shims 350 over the liquid flow portions 376a–376e. The gas side microchannels 352 are also absent over the initial portion of the vapor flow portions, for example over the first 5–10% of the length of the vapor flow portions 378. In the illustrated embodiment, the leading edge 356 of the first gas side channel 352 approximately aligns with the downstream end of the support ribs 379 in channels 378.

In another embodiment, a vaporizer can be formed having only vaporization microchannels 171 without interleaved gas microchannels 152. An example of such a construction would be a vaporizer formed with a stack of shims 170, 270, or 370 without intervening shims 150, 270, or 370. Heat for the vaporizer could be provided by heaters located along the sides of the vaporization microchannels 171. Electric cartridge heaters could be used for this purpose. In this variation, rather than defining heating fluid flow paths, faces 112, 114 would include an array of electric heaters or heating elements. These heating elements could be inserted in preformed holes in the perimeter 182 of the shims 170, 270, 370 with appropriate insulation material outside the heating elements. One use for this alternative construction is as an on demand electric steam generator.

EXAMPLES

Example 1

Figure 4B:
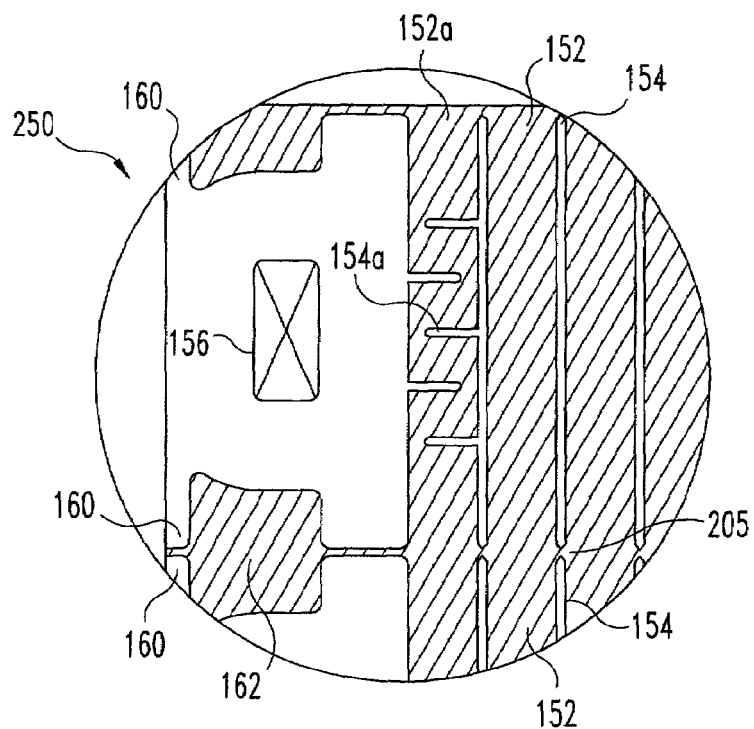
FIG. 4B is an enlarged detail of a portion of the FIG. 4A array with cross hatching indicating recessed portions.
Figure 4A:
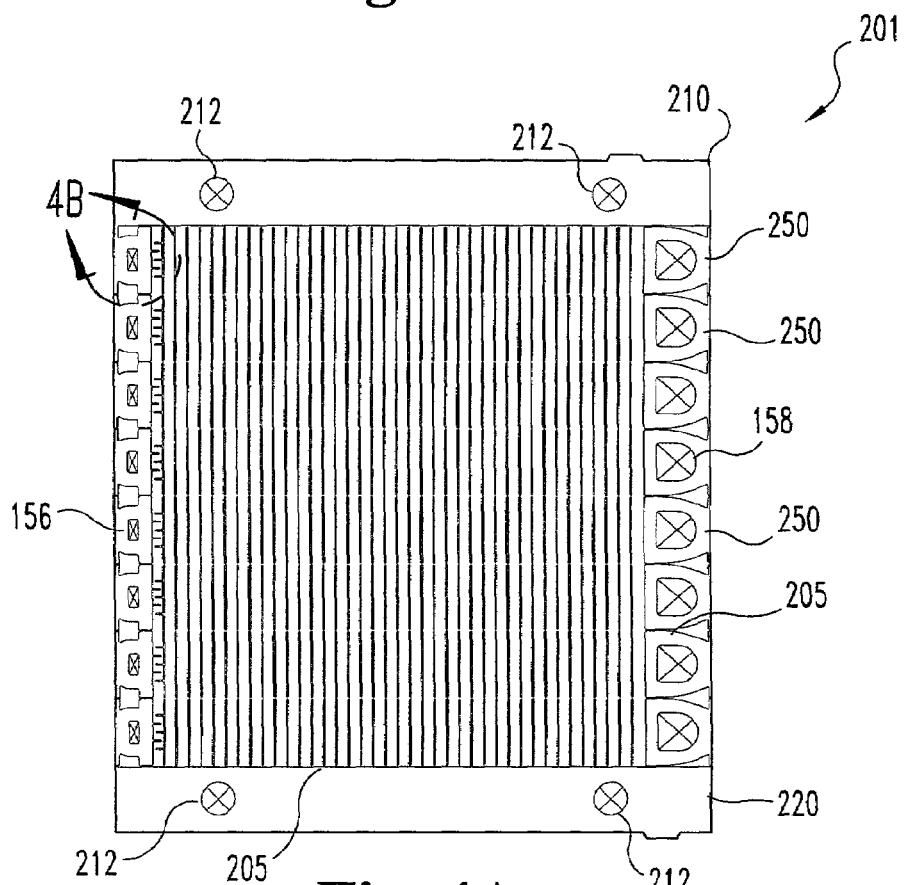
FIG. 4A is a top plan view of a shim array according to another embodiment of the invention with X's indicating through holes.

A water vaporizer was constructed according to the shim design illustrated in FIGS. 4 and 5 with 121 pairs of shim 250 alternately stacked with 120 of shim 270. All shims were formed of stainless steel and were 4.4 inches long (full length, from tab 160 to tab 160) and 0.5 inches wide. The combustion side shims were 0.0155 inches thick with steam channels etches 0.01 inches deep. The steam side shims were 0.01 inches thick with the steam/water channel etched 0.005 inches deep. After diffusion bonding, the stainless steel endplates were machined to a thickness of 0.1 inches and the vaporizer was installed in the assembly of FIG. 1.

Heat transfer of 10 Watts per cubic centimeter (W/cm3) based on total panel volume was obtained while vaporizing water inlet at ambient temperature (approx. 20° C.) to steam outlet at ambient pressure. The combustion gas was inlet at 500° C. and a flow rate of about 900 standard liters per minute (slpm). The combustion gas pressure drop was 2.5 inches of water with outlet to the atmosphere. The volume for calculating the heat transfer density in this example was taken as the volume of the vaporizer 110 including the machined endplates but not including the gas side headers. The endplates can be machined away after fabrication or provided smaller initially without adverse effect on performance. An alternative formulation for measuring heat transfer density is based on the volume of the active region. The active region is the volume of the device within which the interleaved flow channels are in thermal contact. In the illustrated embodiment, the active region is the cross section through which the combustion gas flows (corresponding to face 112 or 114) times the width W of the shim. Measured on this basis the heat tranfer intensity would be 21% higher than the value reported here.

Example 2

Using the device of Example 1 at 1 cubic centimeter per second of water feed at ambient temperature, 900 slpm inlet combustion gas at 480° C., open discharge, and a gas side pressure drop of less than 2.5 inches of water, the steam outlet temperature was about 425° C.

Example 3

Using the device of Example 1 it is expected that about 80 W/cm3 of heat transfer based on total panel volume can be obtained with a 40 inch of water pressure drop for water vaporization with a combustion gas.

Example 4

Using the device of Example 1, it is expected that heat transfer can be obtained from combustion gas at a thermal efficiency of at least about 70%. As used herein "thermal efficiency" is conventionally defined as the actual energy transferred relative to the energy transfer that could occur in an infinitely long counter current heat exchanger at the respective inlet operating conditions. In it also expected that heat transfer can be obtained at a thermal efficiency of at least about 80% or a thermal efficiency between about 70% and 90%.

Example 5

A device was constructed using the shims of FIGS. 9–11 with 61 pairs of shim 350 alternately stacked with 60 facing pairs of shims 370, 380. Six devices were formed with endplates 390, 396 and separated after diffusion bonding by wire EDM as described above. All shims were formed of stainless steel and were 8.74 inches long and 0.7 inches wide. The combustion side shims were 0.01 inches thick with steam channels etches 0.005 inches deep. The steam side shims were 0.015 inches thick with all the steam/water channel etchings 0.0075 inches deep. Examples of the operating parameters for this vaporizer are given in Table 1 for two different operating conditions.

TABLE 1

Examples of Steady State Operating Conditions

| Condition | A | B |
|---|---|---|
| Gas Side pressure drop (process gas ~atmospheric pressure), inches $H_2O$ | 2.5 | 5.0 |
| Combustion gas inlet temperature, °C. | 703 | 685 |
| Combustion Outlet Temperature Observed at single point/expected, °C. | 138/158 | 153/157 |
| Gas Composition/flow (obtained by burning $H_2$ in air) | | |
| mol/h water | 124.4 | 233.8 |
| mol/h nitrogen | 953.4 | 1880.4 |
| mol/h oxygen | 191.2 | 383.0 |
| Water Feed Rate to Vaporizer (at ~22° C.), mol/h/(cm3/s) | 415.3/(2.1) | 814.7/(4.1) |
| Steam Pressure at vaporizer exit, psig | 20 | 47 |
| Final steam temperature, °C. | 276 | 225 |
| Steam-side calculated duty observed, W (watts) | 6088 | 11492 |
| Heat transfer intensity within active region, W/cm3 | 24.1 | 45.4 |
| Heat transfer intensity based on total panel volume, W/cm3 | 15.2 | 28.7 |
| Maximum Theoretically achievable duty under condition operating conditions | 7338 | 13948 |
| Percent of Maximum Theoretically achievable duty achieved | 83.0% | 82.3% |

The active region is defined by the cross section through which the combustion gas flows. It includes the solid metal volume at the shim edge that provides sealing of the vaporizing channel. Measurements on this region are 7 in.×3.15 in.×0.7 in. for a volume of 253 cm³.

The total panel volume includes the total shim volume plus the endplates which measures 8¾ in×4 in×0.7 in. for a total volume of 401 cm³. In commercial applications the endplates could be of diminished size or could be machined away after fabrication without adverse effect on performance.

The expected value for the combustion outlet temperature is obtained by heat balance using the inlet water and combustion gas flows and temperatures and the final steam temperature. The variation with the measured combustion outlet temperature is attributable to the fact that the outlet temperature was measured with a single thermocouple relatively close to the panel outlet face before the outlet gas has had a chance to fully remix. The measured outlet temperature demonstrated a range of values +/- approximately 15° C. depending on the location of the thermocouple along the outlet face.

Example 6

The device according to Example 5 is expected to be operable to vaporize water with a flue gas inlet temperature of about 1150° C. and with liquid water fed at a sufficient flow rate to produce water saturated steam. The efficient heat transfer to the steam side provided by the Example 5 device is expected to maintain the temperature of the metal of the shims at an acceptably low level selected to maintain the outlet While the embodiments described above have all utilized individual shims that are of constant width such that faces 112 and 114 are generally parallel, alternative configurations are contemplated. For example, shims can have a tapered profile getting gradually larger in the direction of steam flow. Furthermore, the steam channel 176 can be of gradually increasing size with the increasing width of the steam shim. Alternatively or in addition, the size of any of the microchannels can be varied by making them wider or deeper on a single shim or by providing corresponding etching on facing surfaces of adjacent shims.

In addition, while the assembly 120 has been described with respect to vaporization of water, gasoline or other fluids can be vaporized, for example as is useful in fuel cell application. Applications requiring a rapid start up, which can be achieved by increasing the flow rate through the device, are also contemplated. One example of a rapid start up application would be a steam reformer in an automotive application.

Heat transfer between a gas and a vaporizing liquid or between a gas and a condensing liquid, for example by running the vapor flow in reverse with gas side cooling, are examples of contemplated heat transfer applications that include a phase change. Heat transfer applications are also contemplated where no phase transition occurs. For example inventive heat exchangers can be used to transfer heat between a gas and a liquid, between a gas and a vaporized liquid, or between a high pressure gas and a low pressure gas. In these or other applications, microchannels 171 may be of substantially uniform cross section along their lengths. Nonlimiting examples of particular applications include the use of inventive heat exchangers as part of an on-demand water heater system, as a steam superheater, or as a condenser.

Moreover, additional unit operations can be performed either in the present device or in further devices connected in series with the present device. For example, a catalyst can be provided in one or both of the flow paths to cause one or both of the fluid streams to undergo a chemical reaction. In one useful aspect, the chemical reaction is temperature sensitive and/or is either exothermic or endothermic. In this aspect, the reaction can be controlled by providing a heating or cooling fluid in one of the flow paths while the reaction is occurring in the other flow paths.

Use of the present panel heat exchange configuration provides an efficient mechanism for controlling the temperature of a single reaction or of competing reactions. Reversible reaction are suitable subjects for control according to the present invention. Examples of useful exothermic reactions include sabatier, preferential oxidation, partial oxidation, and water gas shift reactions. Examples of useful endothermic reactions include steam reforming and the reverse water gas shift. Other contemplated reactions include ammonia synthesis, methanol synthesis, esterfication, olefin hydration, MTBE synthesis, and selective methanation.

Further examples of thermal control of reactions according to the techniques described herein and exemplary techniques for conducting catalyzed reactions in microchannels are given in U.S. Provisional Application Ser. No. 60/363,269 filed Mar. 11, 2002 and U.S. Provisional Application Ser. No. 60/379,163 filed May 9, 2002 each titled Microchannel Reactors for Temperature Control and assigned to the same assignee as the present application.

Reaction catalysts can be provided in the flow paths in powdered or pelletized form, deposited on sheets of engineered support material such as felt or foam, or deposited on flow paths walls. The approptiate reaction catalyst can be generally evenly distributed through each of the microchannels or optionally locally concentrated at the beginning of or at discrete locations through the microchannels. For example, when a combustion reaction in the short flow paths is used for heating (for example to supply heat an endothermic reaction occurring in the longer flow paths), the combustion catalyst may usefully be concentrated near the gas inlet face.

One form of using the present panel fluid processing device for conducting controlled temperature reactions is to have the reaction occur in the longer flow paths with heat exchange fluid cooling (or heating) the reaction via the shorter flow paths. When the heat exchange fluid is in the shorter flow paths, a relatively consistent cooling fluid temperature can be maintained around all or at least a substantial portion of the reaction flow paths, which are the longer flow paths. In this manner, a relatively consistent temperature profile can be maintained between a number of identical reaction flow paths in which a reaction occurs that either consumes (endothermic) or generates (exothermic) heat being provided or removed by the heat exchange fluid. In this aspect, the longer flow path can be of constant cross sectional area throughout the relevant flow length. The heat exchange flow paths can be uniform throughout the device or they can be of varying size and/or separation, for example to provide a greater heat transfer density at different portions of the reaction panel.

Control of reaction temperature according to the present invention can be used to optimize the particular reaction of interest or to optimize a particular reaction when there are competing reactions. Alternatively or in addition, temperature control can be used to reduce the extremes in terms of highs and lows of temperatures within the reactor to improve reactor performance with respect to other factors, such as corrosion (lower maximum temp), sulfur poisoning (higher minimum temperature) and carbon deposition (reduction in sulfur poisoning and higher minimum temperature).

Heating or cooling using a fluid flowing through the short flow paths can extend the operating range for the system by permitting a hotter or colder fluid to be used than could be used in a longer heating or cooling channel. One reason is that the relatively short flow length encourages the thermal conduction from the front to the back of the panel effectively spreading the heat (or cooling) from the inlet face to prevent excessive temperature variation through the short flow paths. In turn, temperature gradients across the width W of the longer flow paths are also minimized.

Where a combustion gas flows in the short flow paths, the combustion can occur at higher temperature without causing the metal of the reactor panel to reach the high temperatures resulting in significant efficiency gains for the system. These efficiency gains are obtained with less complication compared to the alternative of multiple-staged combustion. Reduction of temperature variations in the combustion flow path also has advantages in terms of preventing corrosion.

A similar situation exists when a cooling gas is provided in the short flow paths for cooling an exothermic reaction occurring in the longer flow paths. Many exothermic reactions must be cooled for equilibrium or product distribution requirements but must not be cooled to the extent that the reaction is quenched kinetically. Examples of these reactions are the water gas shift and preferential oxidation reactions. In the panel configuration a small flow of a fluid much colder than the minimum temperature to maintain kinetics can be used to cool the device by passing the coolant through the face of the panel and allowing conduction in the coolant flow direction to even out the temperature and to prevent the reaction near the coolant inlet from being quenched. By virtue of the conduction in the coolant flow direction, the metal wall in contact with the reaction, which determines reaction quenching, could still be above the reaction quenching temperature even though the coolant temperature is below the quenching temperature. Alternatively the coolant temperature could be near or above the desired minimum temperature to avoid quenching the reaction in more conventional fashion.

As will be recognized by those of skill in the art, one form of the invention is a heat transfer device having at least one first channel for transporting a first fluid from an inlet to an outlet and at least one second channel disposed relative to the first channel to transfer heat between the two channels and having a length substantially shorter than the first channel. In preferred forms, the second channel can conduct a second fluid, such as a gas, across the first channel wherein the pressure drop in a gas flowing through the second channel is maintained at a low level under normal operating conditions. In still further refinements or in other forms, the device includes a plurality of first and second channels formed in a heat exchanger element having at least a first face and a second face. In still further refinements or in other forms, at least a portion of the plurality of first channels are formed in the element between the first and second faces and are adapted to transport the first fluid through a flow path positioned between the first and second faces. In still further refinements or in other forms, the plurality of the second channels are formed in the device and extend at least from the first to the second face and are adapted to conduct the second fluid from the first to the second face. In still further refinements or in other forms, the second channels can be positioned between parallel first channels to conduct heat between the second fluid and the first fluid in the parallel first channels. In still further refinements or in other forms the heat conduction element is formed by bonding a stacked array of thin metal shims. In addition to heat conduction through adjacent fluid walls, heat conduction can also occur through heat conduction fins forming at least a portion of the perimeter of the first channels. The heat conduction fins forming a portion of the perimeter can also serve as a bonding surface to seal the first channels during formation of the element in a diffusion bonding process. In still further refinements or in other forms, the second channels are formed from bonded opposing faces of thin shims wherein each of the faces include recessed portions forming a portion of the second channel. In still further refinements or in other forms, at least a portion of the first channels includes a serpentine flow path. In still further refinements or in other forms the first and second channels define orthogonal flow paths forming a crossflow heat exchanger. In preferred forms one or more of the channels are microchannels. In other preferred forms at least about 10 W/cm3 of heat transfer, measured relative to the volume of bonded stacked shims forming the heat exchanger element is obtained at a gas side pressure drop of less than about 2.5 inches of water.

In another form the invention is a cross flow fluid heat exchanger comprising a stack of thin metal sheets bonded by integral metal-to-metal bonds, the stack including alternating recessed sheets having holes at opposing ends, wherein first ones of the recessed sheets define at least a portion of at least one first flow path between the holes, and wherein second ones of the recessed sheets define at least a portion of at least one second flow path separate from the holes and in a direction generally orthogonal to a line connecting the two holes. In further refinements or in other forms, the second flow path is substantially shorter than the first flow path, and a plurality of supports are positioned between adjacent flow paths on the second ones of the sheets. In further refinements or in other forms, only one first flow path is formed on one of the first sheets. In further refinements or in other forms, the first flow path includes a serpentine flow path. In further refinements or in other forms, the first flow path is at least partially sealed by bonding to a face of one of the second recessed sheets. In further refinements or in other forms supports are provided in the first flow path to bond to a face of a thin sheet. In further refinements or in other forms the holes align to form headers for distributing fluid through the first flow paths, the holes being of non-uniform size such that variations in the pressure in the headers throughout the stack are reduced.

In a further form of the invention a technique for forming a fluid processing device includes forming a plurality of individual fluid processing units together and then separating the units after some degree of assembly. In further refinements or in other forms a plurality of thin sheets are stacked between two endplates wherein each of the sheets have a section of a plurality of individual fluid processing units, a plurality of sections combining to define one or more microchannels in a fluid processing unit. In further refinements or in other forms, alignment holes are provided in sacrificial strips at the ends of the sheets to receive at least one alignment post from the endplates, and the array of stacked sheets are contained between the endplates and can be diffusion bonded without side supports. In further refinements or in other forms, after bonding, the individual fluid processing units are separated by cutting the material between the units. In further refinements or in other forms, the separation is performed with wire EDM. In further refinements or in other forms, the individual sections are thin shims having a length substantially greater than their with, which in turn is substantially greater than the thickness of the shims. In further refinements or in other forms, the sections are stacked to form individual fluid processing units having heights substantially greater than their widths, which can be defined by the width of an individual shim. Alternatively or in addition, the individual fluid processing unit can include microchannels having an opening at the boundary between sections of individual fluid processing units wherein separation of the individual processing units with wire EDM results in a rounded profile at the opening of the microchannel such that the pressure drop of a gas flowing through the opening is maintained at a low level. In further refinements or in other forms, to facilitate formation of a rounded profile, the boundary between sections of individual fluid processing units adjacent microchannel opening are provided with portions having a profile substantially corresponding to the microchannel opening portions openings prior to separating the individual units with EDM thereby providing rounding openings to the microchannels. In further refinements or in other forms, the formed fluid processing units include stacked shims defining at least two fluid distribution headers in fluid communication with a plurality of microchannels, and a second plurality of microchannels without a fluid header the method including attaching the formed fluid processing unit to a separately formed gas header.

In a further form a technique for forming a heat exchanger system includes forming a stacked array of thin sheets forming a portion of a fluid processing system and connecting the stacked array to a separately formed gas header for distribution of a gas to a plurality of distinct gas channels in the stacked array. In further refinements or in other forms the stacked array is bonded to form metal to metal bonds. In further refinements or in other forms the array is bonded in a diffusion bonding process and the separately formed gas header is not.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein.

What is claimed is:

1. A heat exchanger comprising:
   a plurality of first microchannels and a plurality of second microchannels for conveying first and second fluids respectively;
   wherein the first microchannels are in thermal contact with the second microchannels, the first microchannels having a microchannel flow length of at least a first value;
   wherein the second microchannels have a second microchannel flow length not greater than a second value;
   wherein the first value is at least about 4 times the second value.

2. The heat exchanger of claim 1 wherein a plurality of the second microchannels are interleaved between the first microchannels.

3. The heat exchanger of claim 2 further comprising a primary heat transfer surface in thermal contact with the first microchannels and at least one secondary heat transfer surface extending from the primary heat transfer surface a distance substantially greater than the smallest dimension of the first microchannel.

4. The heat exchanger of claim 3 wherein the secondary heat transfer surface extends from the primary heat transfer surface in a direction substantially parallel to the primary heat transfer surface.

5. The heat exchanger of claim 2 wherein the first value is at least about 8 times the second value.

6. The heat exchanger of claim 1 wherein the plurality of first microchannels are vaporization microchannels including a liquid flow path in fluid communication with a vapor flow path having a cross sectional area substantially greater than the cross sectional area of the liquid flow path.

7. The heat exchanger of claim 6 wherein the liquid flow path includes a tortuous flow path for establishing a pressure drop in the liquid flow path to control distribution of the first fluid in the plurality of first microchannels.

8. The heat exchanger of claim 1 formed as a stack of thin sheets integrally bonded, the stack including alternating recessed sheets having holes at opposing ends wherein the recesses in the sheets define at least a portion of the first and second microchannels.

9. The heat exchanger of claim 8 wherein the first plurality of microchannels define a flow path between the holes and the second plurality of microchannels define a flow path separate from the holes and in a direction generally orthogonal to a line connecting the holes.

10. A vaporizer comprising:
a plurality of generally parallel first vaporization flow paths for conveying a vaporizing fluid interleaved and in thermal contact with a plurality of second generally parallel flow paths for conveying a heat exchange fluid;
wherein each of the first vaporization flow paths include a liquid flow portion in fluid communication with a vapor flow portion having a cross sectional area substantially greater than the cross sectional area of the liquid flow portion; and
wherein the liquid flow portion of each of the first vaporization flow paths include at least one tortuous microchannel having at least three turns of at least about 60 degrees for establishing a substantial pressure drop through the respective liquid flow portions.

11. The vaporizer of claim 10 wherein the at least one tortuous microchannel includes at least five turns of at least about 90 degrees.

12. The vaporizer of claim 11 wherein the at least one tortuous microchannel includes at least ten turns of at least about 90 degrees.

13. The vaporizer of claim 10 wherein the second flow paths for a second heat exchange fluid are microchannels having a microchannel flow length substantially less than the flow length of the portion of the first vaporization flow path in thermal contact with the second flow paths.

14. The vaporizer of claim 10 wherein the liquid flow portion of each of the first vaporization flow paths include a plurality of tortuous microchannels in parallel flow and each having at least three turns of at least about 60 degrees.

15. The vaporizer of claim 14 wherein the plurality of tortuous microchannels are in fluid communication with a common tortuous microchannel.

16. The vaporizer of claim 14 wherein the plurality of tortuous microchannels are in communication with a corresponding plurality of vapor flow portions distinct from each other near their junctions with the tortuous microchannels.

17. The vaporizer of claim 16 wherein the corresponding plurality of vapor flow portions are microchannels in fluid communication with a common vapor outlet header.

18. The vaporizer of claim 17 wherein the vapor flow paths are in fluid communication with a common vapor outlet header.

19. The vaporizer of claim 10 wherein the second flow paths for conveying a heat exchange fluid are not in direct thermal contact with the tortuous microchannel of the liquid flow portions to substantially prevent vaporization of the vaporizing fluid when it is flowing through the tortuous microchannel.

20. The vaporizer of claim 10 wherein a vaporizing fluid is in the vaporization microchannels and the pressure drop through the liquid flow portions of the first flow paths is at least about equal to the pressure drop through the vapor flow portions of the first flow paths.

21. The vaporizer of claim 10 formed as a stack of thin sheets integrally bonded, the stack including alternating recessed sheets having holes at opposing ends wherein the recesses in the sheets define at least a portion of the first and second flow paths.

22. A vaporizer comprising:
a stack of thin sheets integrally bonded, the stack including alternating recessed sheets having holes at opposing ends wherein the recesses in the sheets define at least a portion of first and second distinct flow paths;
wherein the first flow paths are operable to convey a vaporizing fluid between the holes and include a liquid flow portion in communication with a vapor flow portion having a cross sectional area substantially greater than the cross sectional area of the liquid flow portion, the liquid flow portion including at least one tortuous microchannel;
wherein the second flow paths are separate from the holes and in thermal contact with at least a portion of the vapor flow portion of the first flow paths.

23. The vaporizer of claim 22 wherein each of the liquid flow portions of the first flow paths include a plurality of tortuous microchannels in parallel flow.

24. The vaporizer of claim 22 wherein the length of each of the second flow paths is substantially less than the distance between the holes.

25. The vaporizer of claim 22 wherein the length of each of the second flow paths is less than about ⅛ of the distance between the holes.

26. A method comprising:
providing a single pass cross-flow heat exchanger comprising interleaved first and second flow paths wherein at least one of the first and second flow paths include at least one microchannel;
conveying a first fluid in the first flow paths;
conveying a combustion gas in the second flow path through an active hot gas flow region of the heat exchanger to transfer heat to the first flow path;
wherein the volumetric heat transfer intensity based on the volume of the active hot gas flow region is at least about 30 W/cm3 and the thermal efficiency, defined relative to an infinitely long countercurrent heat exchanger at the respective fluid inlet conditions, is at least about 70%; and
wherein the pressure drop of the combustion gas through the second flow path in inches of water is less than about 10 times the inverse of the pressure of the combustion gas in atmospheres at an inlet to the second flow paths.

27. The method of claim 26 wherein the volumetric heat transfer intensity is at least about 40 W/cm3.

28. The method of claim 27 wherein the pressure drop in inches of water is less than about 5 times the inverse of the pressure of the combustion gas in atmospheres at an inlet to the second flow paths.

29. The method of claim 26 wherein the pressure drop in inches of water is less than about 5 times the inverse of the pressure of the combustion gas in atmospheres at an inlet to the second flow paths.

30. The method of claim 26 wherein the Reynolds number of the flow of the hot gas in the heat exchanger is less than about 500.

31. The method of claim 30 wherein the first fluid includes a liquid and the first flow paths are vaporization flow paths including a liquid flow section in communication with a vapor flow section of substantially greater cross sectional area than the liquid flow section.

32. The method of claim 26 wherein the first and second flow paths each include at least one microchannel.

33. A method of vaporizing a liquid comprising:
flowing a first stream including liquid through a plurality of first vaporization microchannels each including a liquid flow portion in fluid communication with a vapor flow portion having a cross sectional area substantially greater than the cross sectional area of the liquid flow portion wherein the liquid flow portions each include at least one tortuous microchannel liquid flow path for establishing a pressure drop through the liquid flow portions;

heating the first stream with a second fluid flowing through second flow paths in thermal contact with the vapor flow portions of the first vaporization microchannels to vaporize at least a portion of the first stream in the vapor flow portions; and while heating the first stream, maintaining the pressure drop through the liquid flow portion of each of the plurality of first vaporization microchannels at least about equal to the pressure drop through the vapor flow portion to control flow of the first stream through the plurality of first vaporization microchannels.

34. The method of claim 33 wherein the distance from the tortuous microchannel liquid flow paths to the closest second flow path is substantially greater than the distance from the vapor flow portions of the first vaporization microchannels to the closest second flow path to avoid direct thermal contact between the tortuous microchannel liquid flow paths and the second flow paths to substantially prevent vaporization of the first stream in the tortuous microchannel liquid flow path.

35. The method of claim 33 wherein the first stream includes water and heating the first stream includes vaporizing the water to steam.

36. The method of claim 35 wherein the first stream is substantially devoid of liquid water at an outlet of the first vaporization microchannels.

37. The method of claim 36 wherein heating the first stream includes superheating the steam a substantial amount.

38. A method of vaporizing a liquid comprising:
flowing a first stream including liquid through a plurality of first vaporization microchannels each including a liquid flow portion in fluid communication with a vapor flow portion having a cross sectional area substantially greater than the cross sectional area of the liquid flow portion;

heating the first stream with a second fluid flowing through second heat exchange microchannels in thermal contact with the first vaporization microchannels to vaporize at least a portion of the first stream;

wherein the Reynolds number of the flow of the second fluid in the second heat exchange microchannels is less than about 1000 and the pressure drop of the second fluid through the second heat exchange microchannels in inches of water is less than about 10 times the inverse of the pressure of the second fluid in atmospheres at an inlet to the second heat exchange microchannels.

39. The method of claim 38 further comprising providing a vaporizer formed as a stack of thin metal sheets bonded by integral metal-to-metal bonds, the stack including alternating recessed sheets having holes at opposing ends wherein the recesses in the sheets define at least a portion of the first and second microchannels.

40. A method comprising:
forming a plurality of individual fluid processing units together and then separating the units after some degree of assembly into individual units;

wherein forming the plurality of individual units together includes forming integral metal-to-metal bonds in a stack of thin metal sheets, the stack including alternating recessed sheets wherein the recesses in the sheets define at least a portion of flow paths for the individual fluid processing units, and wherein the width of the individual units after the separation is substantially less than the height of the stack of thin metal sheets.

41. The method of claim 40 wherein forming integral metal-to-metal bonds includes diffusion bonding.

42. The method of claim 40 wherein forming integral metal-to-metal bonds includes exerting pressure on the stack of thin metal sheets.

43. The method of claim 40 wherein separating the units includes cutting the material between the units.

44. The method of claim 43 wherein the cutting is performed by wire EDM.

45. The method of claim 40 wherein the recesses in the sheets define at least portions of first and second generally orthogonal flow paths wherein the second flow path spans the width of the individual unit and the first flow paths generally spans the length of the unit, and wherein the length of the unit is at least about 4 times the width of the unit.

46. The method of claim 45 wherein the first and second flow paths are microchannels.

47. A method for vaporizing a liquid to produce superheated vapor:
flowing a first stream including liquid through a plurality of first vaporization microchannels disposed between a macrochannel inlet and a macrochannel outlet, each vaporization microchannel including a liquid flow portion in fluid communication with a vapor flow portion having a cross sectional area substantially greater than the cross sectional area of the liquid flow portion;

vaporizing and substantially superheating the first stream in the first vaporization microchannels by heating the first stream with a second fluid flowing through second heat exchange microchannels in thermal contact with the first vaporization microchannels along the microchannel flow length of the first vaporization microchannels.

48. The method of claim 47 wherein the microchannel flow length of the first vaporization microchannels is at least about 4 times greater than the microchannel flow length of the second heat exchange microchannels.

49. The method of claim 48 wherein first and second microchannels are formed in a panel having first and second faces each having a length and a height wherein the second heat exchange microchannels extend between the first and second faces and wherein the width of the panel between the first and second faces is substantially less than the length and the height of each of the faces.

50. The method of claim 47 wherein flowing the first stream includes flowing the first stream through a tortuous microchannel to maintain a substantial pressure drop in the liquid flow portion.

51. The heat exchanger of claim 1 wherein the first microchannels are reaction microchannels including a reaction catalyst.

52. The heat exchanger of claim 51 wherein the reaction catalyst is a catalyst for a sabatier reaction, a preferential oxidation reaction, a steam reforming reaction, a partial oxidation reaction, a water gas shift reaction, a reverse water gas shift reaction, an ammonia synthesis reaction, a methanol synthesis reaction, an esterfication reaction, an olefin hydration reaction, a MTBE synthesis reaction, or a selective methanation reaction.

53. The heat exchanger of claim 51 wherein the second flow paths are reaction microchannels including a reaction catalyst.

54. The heat exchanger of claim 53 wherein the reaction catalyst in the second flow paths is a combustion catalyst.

55. A method comprising:
providing a stack of thin sheets integrally bonded, the stack including a plurality of recessed sheets having holes at opposing ends wherein the recesses in the sheets define at least a portion of a plurality of generally parallel first vaporization flow paths operable to convey a vaporizing fluid between the holes and including a liquid flow portion in communication with a vapor flow portion having a cross sectional area substantially greater than the cross sectional area of the liquid flow portion, the liquid flow portions of each of the first vaporization flow paths including at least one tortuous microchannel for establishing a pressure drop through the liquid flow portion of the first vaporization flow paths;
flowing a first fluid containing liquid into each of the first vaporization flow paths while maintaining a sufficient pressure drop in the liquid flow portions to control distribution of the first fluid to each of the first vaporization flow paths;
while flowing the first fluid, heating the first fluid to vaporize at least a portion of the liquid while in the vapor flow portions.

56. The method of claim 55 wherein heating the first fluid includes heating the first fluid with a second fluid flowing through second flow paths interleaved between the first flow paths and formed from the recesses in the stacked sheets.

57. The method of claim 55 wherein heating the first fluid includes heating with an electric heater.

58. A fluid processing device comprising:
a plurality of first reaction flow paths having a smallest dimension less than about 1 cm and including a reaction catalyst; and
a plurality of second heat exchange microchannels interleaved and in thermal contact with ones of the first reaction flow paths;
wherein the first flow paths are in thermal contact with the second microchannels over a flow length of at least a first value;
wherein the second microchannels are in thermal contact with the first flow paths over a microchannel flow length not greater than a second value;
wherein the first value is at least about 8 times the second value.

59. A method for forming a heat exchanger system comprising:
forming a stacked array of thin sheets forming a portion of a fluid processing system, the stacked array defining a first and second face having a plurality of distinct gas microchannels therebetween; and
connecting the stacked array to a separately formed gas header for distribution of a gas to the plurality of distinct gas microchannels in the stacked array;
wherein each of the first and second faces has a length and a width substantially greater than the distance between the faces.

60. The method of claim 59 wherein the stacked array is bonded to form metal to metal bonds.

61. The method of claim 59 wherein the array is bonded in a diffusion bonding process and the separately formed gas header is not.

* * * * *